(12) United States Patent  (10) Patent No.: US 8,577,498 B2
Kawano et al.  (45) Date of Patent: Nov. 5, 2013

(54) AUTOMATIC TRANSFER METHOD, TRANSFER ROBOT, AND AUTOMATIC TRANSFER SYSTEM

(75) Inventors: Hajime Kawano, Osaka (JP); Takanori Goto, Osaka (JP); Toru Nakagawa, Osaka (JP); Tamao Okamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 1363 days.

(21) Appl. No.: 12/123,752

(22) Filed: May 20, 2008

(65) Prior Publication Data

US 2008/0294287 A1  Nov. 27, 2008

(30) Foreign Application Priority Data

May 21, 2007 (JP) ................................ 2007-133710
May 16, 2008 (JP) ................................ 2008-129155

(51) Int. Cl.
*G06F 19/00*  (2011.01)
(52) U.S. Cl.
USPC ........... 700/245; 700/246; 700/250; 700/253; 700/257
(58) Field of Classification Search
USPC .................. 235/383; 700/214, 216, 245–264
See application file for complete search history.

(56) References Cited

U.S. PATENT DOCUMENTS

| | | | |
|---|---|---|---|
| 4,857,912 A * | 8/1989 | Everett et al. | 340/508 |
| 5,057,677 A * | 10/1991 | Bertagna et al. | 235/380 |
| 5,446,445 A * | 8/1995 | Bloomfield et al. | 340/521 |
| 5,659,779 A * | 8/1997 | Laird et al. | 709/226 |
| 6,374,155 B1 * | 4/2002 | Wallach et al. | 700/245 |
| 6,496,755 B2 * | 12/2002 | Wallach et al. | 700/245 |
| 6,548,982 B1 * | 4/2003 | Papanikolopoulos et al. | 318/568.11 |
| 7,030,757 B2 * | 4/2006 | Matsuhira et al. | 340/541 |
| 7,054,716 B2 * | 5/2006 | McKee et al. | 700/245 |
| 7,269,479 B2 * | 9/2007 | Okamoto et al. | 700/245 |
| 7,289,881 B2 * | 10/2007 | Ota et al. | 700/245 |
| 7,750,803 B2 * | 7/2010 | Matsuhira et al. | 340/541 |
| 2002/0095239 A1 * | 7/2002 | Wallach et al. | 700/245 |
| 2003/0156493 A1 * | 8/2003 | Bayer | 367/6 |
| 2004/0073337 A1 * | 4/2004 | McKee et al. | 700/245 |
| 2005/0091684 A1 * | 4/2005 | Kawabata et al. | 725/35 |
| 2006/0049940 A1 * | 3/2006 | Matsuhira et al. | 340/541 |

FOREIGN PATENT DOCUMENTS

JP  2004-142070  5/2004

* cited by examiner

*Primary Examiner* — Bhavesh V Amin
(74) *Attorney, Agent, or Firm* — Wenderoth, Lind & Ponack, L.L.P.

(57) ABSTRACT

A transfer robot for accommodating and transferring a transferred object has a transfer route storage section, a movement mechanism section, and a security level setting section. The transfer route storage section stores a transfer route having been set up at least on the basis of transfer destination information for the transferred object. The movement mechanism section causes the transfer robot to move toward a transfer destination on the basis of the transfer route. The security level setting section switches a security level of the transfer robot under movement on the basis of a zone level defined beforehand by each region in the transfer route, present position information of the transfer robot, and type information of the transferred object.

14 Claims, 29 Drawing Sheets

Fig. 3

| CARRIED ARTICLE / ZONE LEVEL | IMPORTANT ARTICLE (MAIL, PARCEL, BAGGAGE ETC.) | | GENERAL ARTICLE (NEWSPAPER, CIRCULAR NOTICE ETC.) | | DISCARDED ARTICLE (GARBAGE ETC) | | NO CARRIED ARTICLE | |
|---|---|---|---|---|---|---|---|---|
| | WITH ACCOMP. PERSON | WITHOUT ACCOMP. PERSON | WITH ACCOMP. PERSON | WITHOUT ACCOMP. PERSON | WITH ACCOMP. PERSON | WITHOUT ACCOMP. PERSON | WITH ACCOMP. PERSON | WITHOUT ACCOMP. PERSON |
| AA ZONE (SAFETY ZONE) INSIDE OF ROOM | SL2 | SL2 | SL2 | SL2 | SL1 | SL1 | SL0 | SL0 |
| A ZONE (SEMI-SAFETY ZONE) INSIDE OF BUILDING INSIDE OF PASSAGE, PATH, ELEVATOR | SL2 | SL3 | SL2 | SL3 | SL1 | SL1 | SL0 | SL0 |
| B ZONE (CAUTION ZONE) INSIDE OF SITE, PARKING LOT, ENTRANCE HALL | SL3 | SL4 | SL2 | SL4 | SL1 | SL1 | SL0 | SL0 |
| C ZONE (DANGER ZONE) OUTSIDE OF SITE GARBAGE SHED, PUBLIC ROAD ETC | SL4 | SL5 | SL3 | SL5 | SL1 | SL2 | SL0 | SL0 |

Fig. 12

| FLOOR NUMBER \ HOME NUMBER | 0 | 1 | 2 | 3 | 4 |
|---|---|---|---|---|---|
| P3 |   |   |   |   |   |
| P2 |   | A |   |   |   |
| P1 | B |   |   |   |   |
| P0 |   |   |   |   |   |

Fig. 14

| FLOOR NUMBER \ HOME NUMBER | 0 | 1 | 2 | 3 | 4 |
|---|---|---|---|---|---|
| P3 | I | I | I | I | |
| P2 | | | | | |
| P1 | I | I | | | |
| P0 | I | | | | |

*Fig. 15*

| FLOOR NUMBER \ HOME NUMBER | 0 | 1 | 2 | 3 | 4 |
|---|---|---|---|---|---|
| P3 | I | I | I | I | |
| P2 | II | II | | | |
| P1 | I | I | | | |
| P0 | I | | | | |

Fig. 16

| FLOOR NUMBER \ HOME NUMBER | 0 | 1 | 2 | 3 | 4 |
|---|---|---|---|---|---|
| P3 | II | II | I | I | |
| P2 | | | | | |
| P1 | I | I | | | |
| P0 | I | | | | |

Fig. 18

| FLOOR NUMBER \ HOME NUMBER | 0 | 1 | 2 | 3 | 4 |
|---|---|---|---|---|---|
| P3 | I | I | I | I | |
| P2 | | | | | |
| P1 | I | II | | | |
| P0 | I | I | | | |

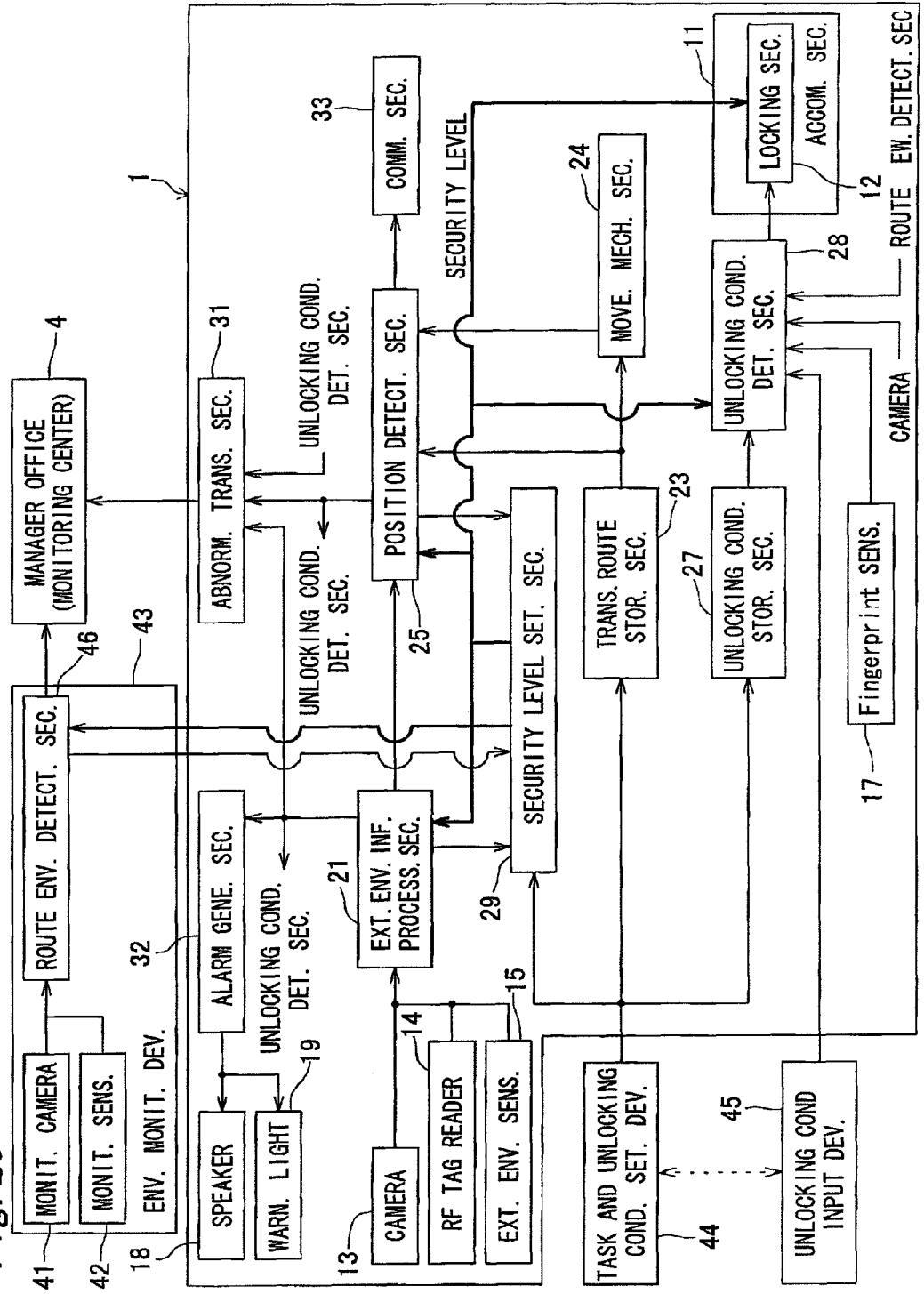

Fig. 23

| ZONE LEVEL \ CARRIED ARTICLE | IMPORTANT ARTICLE (MAIL, PARCEL, BAGGAGE ETC.) | | GENERAL ARTICLE (NEWSPAPER, CIRCULAR NOTICE ETC.) | | DISCARDED ARTICLE (GARBAGE ETC) | |
|---|---|---|---|---|---|---|
| | WITH ACCOMP. PERSON | WITHOUT ACCOMP. PERSON | WITH ACCOMP. PERSON | WITHOUT ACCOMP. PERSON | WITH ACCOMP. PERSON | WITHOUT ACCOMP. PERSON |
| AA ZONE (SAFETY ZONE) INSIDE OF ROOM | SL2/SL5 | SL2/SL7 | SL2/SL5 | SL2/SL7 | SL1/SL5 | SL1/SL6 |
| A ZONE (SEMI-SAFETY ZONE) INSIDE OF BUILDING INSIDE OF PASSAGE, PATH, ELEVATOR | SL2/SL7 | SL3/SL8 | SL2/SL7 | SL3/SL8 | SL1/SL6 | SL1/SL6 |
| B ZONE (CAUTION ZONE) INSIDE OF SITE, PARKING LOT, ENTRANCE HALL | SL3/SL8 | SL4/SL9 | SL2/SL7 | SL4/SL9 | SL1/SL6 | SL1/SL6 |
| C ZONE (DANGER ZONE) OUTSIDE OF SITE GARBAGE SHED, PUBLIC ROAD ETC | SL4/SL9 | SL5/SL10 | SL3/SL8 | SL5/SL10 | SL1/SL6 | SL2/SL7 |
| X: TRANSFER DESTINATION (DESTINATION LOCATION) | IN ADDITION TO SECURITY LEVEL, INPUT OF UNLOCKING CONDITION BY USING UNLOCKING CONDITION INPUT DEVICE IS REQUIRED | | | | | |

AUTOMATIC TRANSFER METHOD, TRANSFER ROBOT, AND AUTOMATIC TRANSFER SYSTEM

BACKGROUND OF THE INVENTION

The present invention relates to an automatic transfer method, a transfer robot, and an automatic transfer system. More specifically, the present invention relates to a technique of automatically transferring a transferred object by using a transfer robot capable of autonomous movement.

Japanese Laid-Open Patent Publication No. 2004-142070 discloses a system for automatically transferring a transferred object to a destination by using a transfer robot 101 capable of autonomous movement shown in FIG. 27.

This transfer robot 101 comprises: an important object storage box 102 for accommodating a transferred object; a GPS receiving section 103 and position receiving means 104 for acquiring position information; a storage section 105 for storing beforehand the position information and a transfer sequence (traveling sequence) for a transfer destination; and a storage box controlling means 106. The storage box controlling means 106 performs control such that when two conditions are satisfied, an important object accommodated in the important object storage box 102 is allowed to be taken out. Specifically, when acquired position information agrees with position information concerning the transfer destination defined beforehand and the actual transfer sequence of the transfer robot 101 agrees with a transfer sequence defined beforehand, the storage box controlling means 106 allows the accommodated object to be taken out from the important object storage box 102. Further, when the transfer route is changed, the transfer robot 101 notifies the abnormal situation to the monitoring center. According to such a configuration, security is ensured during the transfer.

Nevertheless, in conventional automatic transfer employing a transfer robot capable of autonomous movement including that disclosed in Japanese Laid-Open Patent Publication No. 2004-142070, operation with respect to security is uniform and lacks flexibility. Specifically, flexible and dynamic operation of security levels in accordance with conditions (such as the type of the transferred object and a change in the environment around the transfer route to the destination) is not realized.

SUMMARY OF THE INVENTION

An object of the present invention is to realize dynamic and flexible operation of security levels in automatic transfer employing a transfer robot capable of autonomous movement.

A first mode of the present invention provides an automatic transfer method employing a transfer robot and comprising the steps of: setting up a transfer route of a transfer robot on the basis of transfer destination information for a transferred object to be transferred by the transfer robot; causing the transfer robot to move toward a transfer destination on the basis of information concerning the transfer route; and switching a security level of the transfer robot under movement on the basis of a zone level defined beforehand by each region in the transfer route, present position information of the transfer robot, and type information of the transferred object.

A second mode of the present invention provides a transfer robot for transferring a transferred object, comprising: a transfer route storage section for storing a transfer route having been set up on the basis of transfer destination information for the transferred object; a movement mechanism section for moving toward a transfer destination on the basis of the transfer route; and a security level setting section for switching a security level during movement on the basis of a zone level defined beforehand by each region in the transfer route, present position information, and type information of the transferred object.

A third mode of the present invention provides an automatic transfer system comprising: a transfer robot that has a transfer route storage section for storing a transfer route having been set up on the basis of transfer destination information, a movement mechanism section for moving toward a transfer destination on the basis of information concerning the transfer route, and a security level setting section for switching a security level during movement on the basis of a zone level defined beforehand by each region in the transfer route, present position information, and type information of the transferred object; and an environment monitoring device that monitors the transfer route of the transfer robot and switches a monitoring level for the transfer route in accordance with the security level.

According to the present invention, the security level of the transfer robot under movement is switched on the basis of surrounding environment and the like (specifically, the zone level defined beforehand by each region in the transfer route, the present position information of the transfer robot, the type information of the transferred object, and the like). This realizes dynamic and flexible operation of security levels. Then, when the security level is dynamically maintained in an optimal state, security is ensured with minimum energy. Thus, depending on the situation, efficient energy-saving transfer can also be achieved.

BRIEF DESCRIPTION OF THE DRAWINGS

Other objects and features of the present invention will become clear according to the following description of the preferred embodiments with reference to the accompanying drawings in which:

FIG. 3 is a schematic diagram of a decision table for security levels in a first embodiment of the present invention;

FIG. 12 is a schematic diagram showing a route storage section;

FIG. 14 is a schematic diagram showing a state of a route storage section in a case that transfer flow in FIGS. 13A and 13B has been executed correctly;

FIG. 15 is a schematic diagram showing an example of a state of a route storage section in a case that transfer flow in FIGS. 13A and 13B has not correctly been executed;

FIG. 16 is a schematic diagram showing another example of a state of a route storage section in a case that transfer flow in FIGS. 13A and 13B has not correctly been executed;

FIG. 18 is a schematic diagram showing a state of a route storage section in a case that transfer flow in FIGS. 17A and 17B has been executed correctly;

FIG. 20 is a functional block diagram of a transfer robot according to a third embodiment of the present invention;

FIG. 23 is a schematic diagram of a decision table for security levels in a third embodiment of the present invention;

DETAILED DESCRIPTION OF THE PREFERRED EMBODIMENTS

First Embodiment

Figure 1:
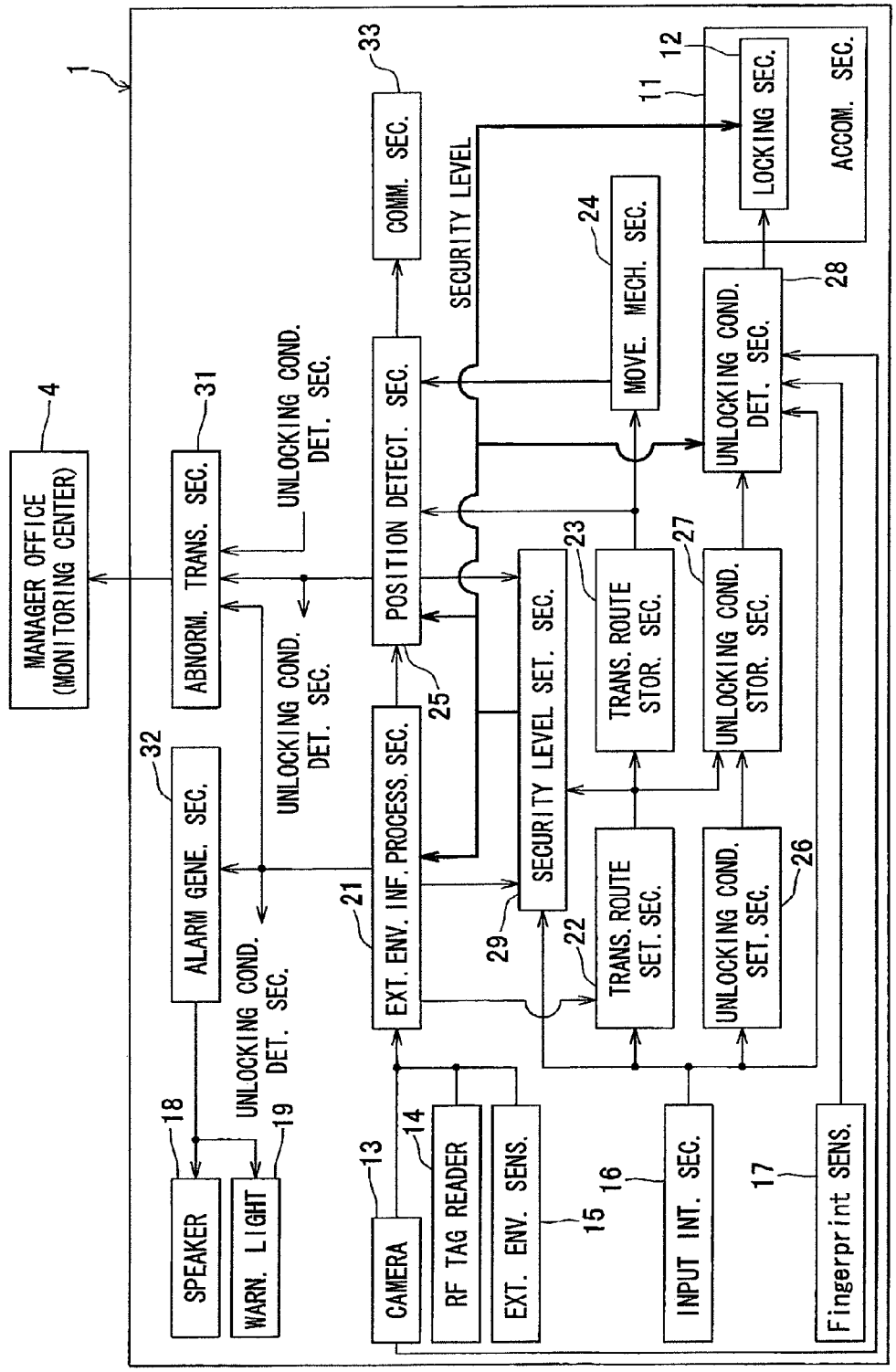
FIG. 1 is a functional block diagram of a transfer robot according to a first embodiment of the present invention.

FIG. 1 shows a transfer robot 1 capable of autonomous movement according to an embodiment of the present invention. The present embodiment is described for a case that a transferred object is transferred in a condominium 2 shown in FIG. 2 by using a transfer robot 1.

Figure 2:
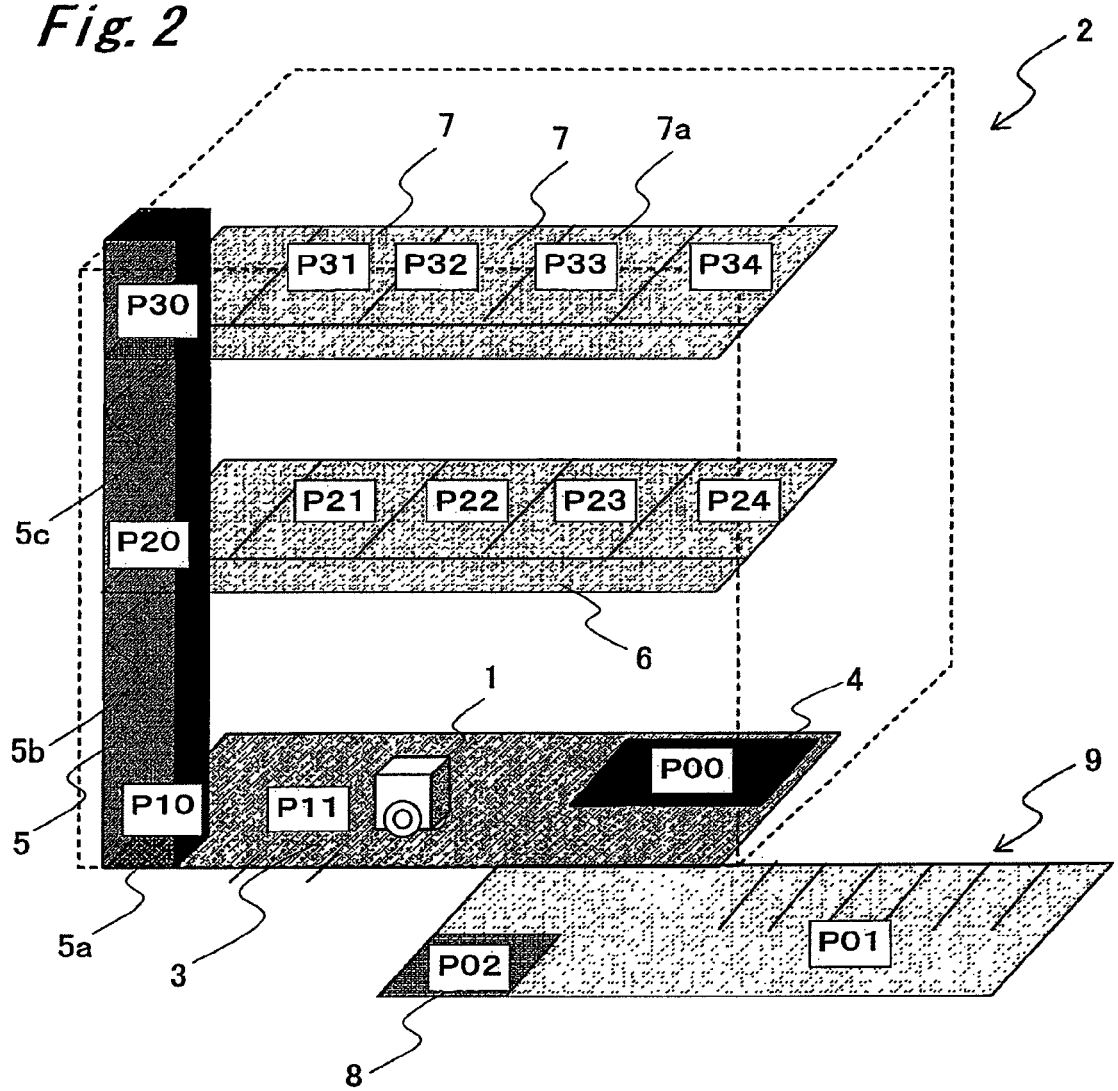
FIG. 2 is a schematic diagram showing a structure of a condominium in a first embodiment of the present invention.

Referring to FIG. 2, on the first floor of the condominium 2, an entrance hall 3 and a building manager's office 4 serving as a monitoring center are arranged. First, a case is assumed that a resident, a visitor, a mail delivery person, a parcel delivery person, or the like enters or exits through the entrance hall 3. A building manager stays always in the building manager's office 4, and performs services (such as relay of a visitor and relay of parcel delivery service) for the residents of the condominium 2. Further, in a case like the present embodiment, it is preferable that the building manager performs the operation and maintenance of the transfer robot 1 and the treatment of the occurrence of abnormality. Movement to the upper floors of the condominium 2 is achieved by using an elevator 5. Residential spaces for individual residents, a passage 6, doors 7 of individual homes, and the like are arranged on each floor of the condominium 2. Further, in the outside of the condominium 2, a garbage shed 8 and a parking lot 9 are arranged.

A symbol indicating a passage point is assigned to each location in the condominium 2. Specifically, symbol P00 indicates the building manager's office 4, symbol P01 indicates the parking lot 9, symbol P02 indicates the garbage shed 8, symbol P10 indicates a first floor elevator door 5a, symbol P20 indicates a second floor elevator door 5b, symbols P21 to 24 indicate the doors of individual homes on the second floor, symbol P30 indicates a third floor elevator door 5c, and symbols P31 to 34 indicate the doors of individual homes on the third floor.

Referring to FIG. 1, the transfer robot 1 has an accommodation section 11 for accommodating (or carrying thereon) a transferred object. A transferred object take-out port (not shown) provided in the accommodation section 11 can be locked by a locking section 12.

The transfer robot 1 has a camera 13, an RF tag reader 14, and an external environment sensor 15 such as an infrared sensor, an ultrasonic sensor, and a laser sensor, which serve as devices for detecting external environment. Further, the transfer robot 1 has an input interface section 16 such as a touch panel sensor and a keyboard through which a user inputs instructions and information. In place of the input interface section 16, an information terminal such as a hand held computer may be employed so that user instructions may be inputted by cable or wireless. Further, the transfer robot 1 has a fingerprint sensor 17. Furthermore, the transfer robot 1 has a speaker 18 and a warning light 19 for warning described later in detail.

The transfer robot 1 has an external environment information processing section 21, a transfer route setting section 22, a transfer route storage section 23, a movement mechanism section 24, a position detecting section 25, an unlocking condition setting section 26, an unlocking condition storage section 27, an unlocking determination section 28, a security level setting section 29, an abnormality transmitting section 31, an alarm generating section 32, and a communication section 33.

The external environment information processing section 21 receives: image information obtained by imaging in the camera 13; and information of an RF tag (non-contact type IC) read by the RF tag reader 14. Such information is inputted to the position detecting section 25. Further, as described later, the external environment information processing section 21 performs abnormality detection, person authentication, and the like by fusing such information.

The transfer destination of a transferred object, the type of the transferred object, a time zone, and the like are inputted from the input interface section 16 to the transfer route setting section 22. The transfer route setting section 22 sets up a transfer route of the transfer robot 1 on the basis of the inputted information. The transfer route is defined by the order or the sequence that the transfer robot 1 passes passage points selected from among the above-mentioned passage points P00 to P34. The transfer route having been set up by the transfer route setting section 22 is stored into the transfer route storage section 23.

The transfer route storage section 23 stores beforehand the structure of the condominium 2. Further, the transfer route storage section 23 stores as passage points the points of the entrance hall 3, the elevator 5, the passage 6 and the like located between the transfer origin and the transfer destination of the transfer route having been set up by the transfer route setting section 22.

The movement mechanism section 24 causes the transfer robot 1 to move in accordance with the transfer route stored in the transfer route storage section 23. The movement mechanism section 24 employs two-wheel or four-wheel running, biped walking, or the like depending on the environment at the time that the transfer robot 1 transfers the transferred object. The present embodiment is described for an exemplary case that the movement mechanism section (wheels) has two wheels. This is because in an environment where passages are narrow and ground surfaces are smoothed like in a condominium, a movement mechanism section having two wheels is expected to be applicable widely.

The position detecting section 25 detects the present position of the transfer robot 1 on the basis of information from the external environment information processing section 21 and the movement mechanism section 24. As described above, the transfer route of the transfer robot 1 is defined by passage points P00 to P34. Then, the locations of these passage points are checked by the position detecting section 25. In other words, the position detecting section 25 checks arrival at each passage point. When the movement mechanism section 24 adopts wheels like in the present embodiment, the position detecting section 25 can detect the present position of the transfer robot 1 by odometry. Specifically, when the movement mechanism section 24 is constructed from wheels, the position detecting section 25 can detect the present position of the transfer robot 1 on the basis of rotation information of the wheels inputted from the movement mechanism section 24. Further, in order to check more reliably arrival at each of the passage points P00 to P34, the position detecting section 25 may identify the present position of the transfer robot 1 together with information from the external environment information processing section 21 (e.g., image information acquired by the camera 13 and information from an RF tag). In this case, the position detecting section 25 does not obtain absolute position information acquired by using a GPS or the like, but obtains relative position information based on the movement situation of the transfer robot 1 traced from the running start position. Arrival at a passage point may be detected only on the basis of image information acquired by the camera 13 or information from an RF tag.

When the detected present position of the transfer robot 1 agrees with each passage point in the transfer route, the position detecting section 25 concludes that the transfer robot 1 has normally arrived at the passage point. In this case, passage information indicating passage of the passage point is outputted to the security level setting section 29 and the communication section 33. The passage information contains not only information indicating arrival at the passage point but also information concerning the situation at the time of passage of the passage point. Information of this kind includes: information indicating whether the transfer robot 1 has got "into" or "off" the elevator 5 at the passage point P10 (the first floor elevator door 5*a*); information indicating whether the transfer robot 1 has "exited" or "entered" the condominium 2 at the passage point P11 (the entrance hall 3); and information indicating whether the transfer robot 1 has "arrived at" or "departed from" the door 7*a* at the passage point P33 (the door 7*a* of the third resident home counted from the elevator door 5*c* on the third floor).

In addition to the detection of the present position and the detection of arrival at the passage points P00 to P34 performed on the basis of this, the position detecting section 25 detects the occurrence of abnormality concerning the present position of the transfer robot 1. Specifically, when the detected present position deviates from the transfer route stored in the transfer route storage section 23, the position detecting section 25 concludes position abnormality. Such deviation from the transfer route is, for example, that the image from the camera 13 or the information of an RF tag read by the RF tag reader 14 indicates a position not located in the transfer route, or alternatively that the present position detected by odometry indicates a position different from the transfer route for a predetermined time. Further, in a case that the present position detected by odometry does not reach at a passage point even when a predetermined time has elapsed, the position detecting section 25 concludes position abnormality. Further, also when the present position detected by odometry does not agree with the image from the camera 13 or the information of an RF tag read by the RF tag reader 14, the position detecting section 25 concludes position abnormality. Furthermore, also when the transfer robot 1 has lost its own position, the position detecting section 25 concludes position abnormality. When the position detecting section 25 detects position abnormality, the abnormality transmitting section 31 transmits the occurrence of abnormality to the building manager's office (monitoring center) 4. When the moving range and the like of the transfer robot 1 are taken into consideration, it is preferable that the transmission from the abnormality transmitting section 31 is performed by wireless communication. Further, when detecting the position abnormality, the position detecting section 25 notifies it to the unlocking determination section 28.

During the running of the transfer robot 1, the external environment information processing section 21 continues image acquisition of the surroundings by the camera 13 so as to monitors the presence of an obstacle not expected in the transfer route. Further, with continuing the image acquisition of the surroundings by the camera 13, when a person is detected in the transfer route, the external environment information processing section 21 performs authentication on the basis of the person's face image acquired by the camera 13. For example, the image is compared with persons' faces registered beforehand. As a result of the comparison, when not registered, the person is determined as a person need be watched or a suspicious person. Further, during the running of the transfer robot 1, the external environment information processing section 21 monitors the surroundings through the external environment sensor 15. When the external environment information processing section 21 detects abnormality through the camera 13 or the external environment sensor 15 or alternatively detects the presence of a suspicious person in the face image authentication, the alarm generating section 32 generates warning in the form of sound from the speaker 18 and in the form of light from the warning light 19. Further, similarly to the case of the above-mentioned position abnormality, the abnormality transmitting section 31 notifies the occurrence of abnormality to the building manager's office 4. The execution or non-execution of monitoring of the surroundings by the external environment information processing section 21, the mode of the monitoring, the processing performed at the time of abnormality detection, and the like are different depending on the security level described later.

Through the input interface section 16, information necessary for setting an unlocking condition is inputted in addition to information necessary for setting the above-mentioned transfer route. Information of this kind includes a password corresponding to each resident which need be inputted to the input interface section 16 when the locking section 12 is to be unlocked. The unlocking condition setting section 26 sets up an unlocking condition on the basis of the inputted information. The unlocking condition having been set up by the unlocking condition setting section 26 is stored into the unlocking condition storage section 27. In addition to the above-mentioned password, the unlocking condition storage section 27 stores, as unlocking conditions, for example: information such as a fingerprint and a face image necessary for biometrics of a resident; an authorized transfer route having been set up by the transfer route setting section 22; and a standard time necessary for the passage between the passage points constituting the transfer route.

Using the unlocking condition stored in the unlocking condition storage section 27, the unlocking determination section 28 determines the permission or non-permission of unlocking of the locking section 12 on the basis of: information such as the password inputted from the input interface section 16; fingerprint detection information inputted from the fingerprint sensor 17; a face image inputted from the external environment information processing section 21; and information such as input from the position detecting section 25. When the unlocking determination section 28 determines the permission of unlocking, the locking section 12 is unlocked so that the transferred object accommodated in the accommodation section 11 is allowed to be taken out from the take-out port. The contents of the unlocking determination in the unlocking determination section 28 and the level of requirement in the unlocking determination are different depending on the security level described later.

The transfer robot 1 can operate an interphone installed in the elevator 5 or the door 7 by wireless or cable through the communication section 33.

During the movement of the transfer robot 1, the security level setting section 29 sets up and outputs a security level. In the present embodiment, the security level setting section 29 sets up the security level on the basis of: information concerning the present position of the transfer robot 1 inputted from the position detecting section 25; information concerning the type of the transferred object inputted from the input interface section 16; the presence or absence of a person (accompanying person) who accompanies the transfer robot 1 and moves along the transfer route, which is inputted from the input interface section 16; image information of the surroundings acquired by the camera 13 and inputted from the external environment information processing section 21; information concerning the state of the surroundings detected by the external environment sensor 15 and inputted from the external environment information processing section 21; and information concerning the present time and the like (indicating whether now is daytime or night. Even after being set up, the security level is not necessarily fixed until arrival at the transfer destination. That is, the security level setting section 29 switches the security level on the basis of these information pieces inputted continuously during the movement of the transfer robot 1.

More detailed description is given below for the setting or switching of the security level by the security level setting section 29 in the present embodiment.

In the setting of the security level, the security level setting section 29 in the present embodiment uses a decision table stored beforehand as shown in FIG. 3. In this decision table, the zone level to which the present position of the transfer robot 1, the presence or absence and the type of a transferred object, and the presence or absence of an accompanying person are taken into consideration as determination conditions for the security level. The security level is divided into six levels of SL0 to SL5. Security level SL0 is a security level in which no security measure is performed. As for security levels SL1 to SL5, security level SL1 is defined as the lowest security level (recognized as a safety zone), while security level SL5 is defined as the highest security level (recognized as a danger zone).

A zone level is defined beforehand for each region included in the transfer route of the transfer robot 1. For example, in the case that the transfer robot 1 moves inside the condominium 2 like in the present embodiment, zone levels are set up individually for the entrance hall 3, the passage 6, the parking lot 9, and the like. From the present position (determined by odometry or on the basis of image information, information from an RF tag, or the like as described above) of the transfer robot 1 inputted from the position detecting section 25, the security level setting section 29 identifies the zone level of the region where the transfer robot 1 is located presently. Then, the security level is set up in accordance with each zone level.

In the present embodiment, locations (regions) in the condominium 2 are divided into four zone levels. This level dividing is described below.

In the transfer by the transfer robot 1, in the inside of the rooms of the residents of the condominium 2, only the residents are contacted. Thus, these locations are defined as AA zones (safety zones) which are safe locations.

In the inside of the condominium 2 (inside of the passage 6, paths, and the elevator 5), many and unspecified persons are not contacted basically. Nevertheless, a possibility is present that a resident who is not the owner of the transferred object under the transfer of the transfer robot 1, a visitor to the condominium 2, or the like can be contacted. Thus, these locations are defined as A zones (semi-safety zones) which are relatively safe locations.

The parking lot 9, the entrance hall 3, and the like are basically within the site of the condominium 2. Nevertheless, many and unspecified persons can enter. Thus, these locations are defined as B zones (caution zones) where the danger level in security is relatively high for the transfer robot 1.

The garbage shed 8, a public road, and the like located outside the site of the condominium 2 are defined as C zones (danger zones) where remarkably dangerous for the transfer robot 1.

In the present embodiment, the security level goes higher in the order of zone levels from AA zone, A zone, B zone, and C zone.

This classification of zones is merely an example and depends on the condition of site of the condominium 2, the difference in the consciousness to security of the residents, and the lightness in the surroundings. In a case that those conditions can be changed by inputting, zone levels can be set up flexibly in accordance with the surrounding environment and the like.

When no transferred object is accommodated in the transfer robot 1, the security level is set up to SL0 (corresponds to no security measure) regardless of other conditions such as the zone level and the presence or absence of an accompanying person. When a transferred object is accommodated, the security level is set up to any one of SL1 to SL5 depending on the importance of the transferred object. Specifically, mails, parcels under delivery service, baggage, and the like are classified into important objects. Newspapers, circular notices, and the like are classified into general objects. Further, garbage and the like are classified into discarded objects. Then, higher importance is imparted in the order of important objects, general objects, and discarded objects.

When an accompanying person accompanies the transfer robot 1, the security level SL1 to SL5 is set up higher in comparison with the case of no accompanying person.

As described above, the decision table in FIG. 3 has 28 security level items in total consisting of: four zone levels;

four levels with respect to the presence or absence and the importance of the accommodated object; and two levels with respect to the presence or absence of an accompanying person for the transfer robot 1. As such, in addition to the switching of the security level depending on the location, the importance of the transferred object (for example: important objects such as mails, parcels under delivery service, and baggage; general objects such as newspapers and the circular notices; and discard objects such as dust) and the presence or absence of an accompanying person during the transfer are determined so as to be adopted as additional conditions for the security level setting. Then, the security level is set up in accordance with a combination of these conditions, so that more flexible setting of the security level is realized.

In the present embodiment, in addition to the conditions taken into consideration in the decision table in FIG. 3, the security level setting section 29 sets up the security level with taking into consideration: surrounding image information acquired by the camera 13; information concerning the state of the surroundings detected by the external environment sensor 15; and the present time. Specifically, when abnormality in the transfer route is detected in the image information of the camera 13 or the detection information of the external environment sensor 15, in the items in the decision table in FIG. 3, each security level other than the highest level SL5 is increased by one level. For example, security level SL2 is increased into security level SL3. When the security level is changed in accordance with a change in the environment of the transfer route, flexible setting of the security level is realized. Further, when the present time is daytime, the security level is as shown in FIG. 3. However, when the present time is night, each security level other than the highest level SL5 is increased by one level. As such, when the security level is changed depending on the time like daytime in which many people are walking around and midnight in which almost no person is walking around, flexible setting of the security level can be realized in accordance with the present time.

In the present embodiment, the security level having been set up by the security level setting section 29 is outputted to the locking section 12, the external environment information processing section 21, the position detecting section 25, and the unlocking determination section 28, and then used for the control of processing for security ensuring in the transfer robot 1 in accordance with the security level. Specifically, in the locking section 12, the execution or non-execution of locking is controlled in accordance with the security level. In the external environment information processing section 21, the execution or non-execution of person authentication and the execution or non-execution of warning at the time of finding a suspicious person are controlled in accordance with the security level. In the unlocking determination section 28, the combination of biometrics (fingerprint or face authentication), a password, a key, and the like used in determination of unlocking is changed depending on the security level, so that requirement level in the unlocking determination is controlled (the requirement level in the unlocking determination is made higher for higher security levels).

More detailed description is given below for the security processing for each security level SL1 to SL5.

At security level SL1, no locking is performed in the locking section 12, no person authentication based on an image or the like is performed, and no warning (e.g., no action of generating sound or light) is issued to a suspicious person. Then, only when abnormality occurs, the abnormality is notified to the building manager's office.

At security level SL2, the locking section 12 performs locking. However, the above-mentioned person authentication and warning are not performed. When abnormality occurs, the abnormality is solely reported.

At security level SL3, the locking section 12 performs locking, and person authentication based on an image or the like is performed. When abnormality occurs, the abnormality is solely reported, but warning is not generated.

At security level SL4, the locking section 12 performs locking. Further, person authentication is performed on the basis of an image and the like. Then, warning such as sound and light is generated to a suspicious person. Further, when abnormality occurs, the abnormality is solely reported.

At security level SL5, the locking section 12 performs locking. Further, person authentication is performed on the basis of an image and the like. Then, warning such as sound and light is generated to a suspicious person. Further, when abnormality occurs, the abnormality is solely reported, while the abnormality situation (an image of the suspicious person and the like) is image-acquired by the camera and then stored.

These methods of processing are merely examples, and not necessarily limited to these methods. That is, these methods may be changed appropriately depending on the situation such as surrounding environment.

Here, another operation is described below in which the security level is employed.

When the security is in a remarkably dangerous level like security level SL5, the transferred object may be transferred in a state that the accommodation mode in the accommodation section 11 of the transfer robot 1 is made more protective, or alternatively in a state that the monitoring of the surroundings performed by the external environment information processing section 21 is strengthened (increase of the sampling rate or expansion of the monitored area of the camera 13 and the external environment sensor 15). In addition to the strengthening of the monitoring, the transfer robot 1 may perform, for example, the processing of actively excluding the suspicious person or the like.

In contrast, at an almost safe level like at security level SL1, for simplicity of management, the accommodation mode in the accommodation section 11 of the transfer robot 1 may be simplified. Alternatively, the monitoring of the surroundings performed by the external environment information processing section 21 may be simplified (reduction of the sampling rate or reduction of the monitored area of the camera 13 and the external environment sensor 15; reduction in the types and the numbers of the external environment sensors 15 used for monitoring). Further, the locking method in the locking section 12 may be changed into a remarkably simple one, or the locking by the locking section 12 may be omitted.

Here, the types and the contents of the conditions in the security level setting are not necessarily limited to those in the present embodiment.

The operation of the transfer robot 1 of the present embodiment is described below for an exemplary case that a parcel under delivery service is transferred from the building manager's office 4 to the door 7a of a resident A home without an accompanying person. The dash-dotted line R1 in FIG. 4 indicates a transfer route of the transfer robot 1 of this case. On this transfer route R1, the transfer robot 1 leaves the building manager's office 4, then passes the entrance hall 3, and then rides the elevator 5 so as to move to a floor (the third floor) where the door 7a of the resident A home is located. After that, the transfer robot 1 gets off the elevator 5 and then passes along the passage 6 so as to transfer automatically the transferred object to the door 7a of the resident A home.

Figure 5:
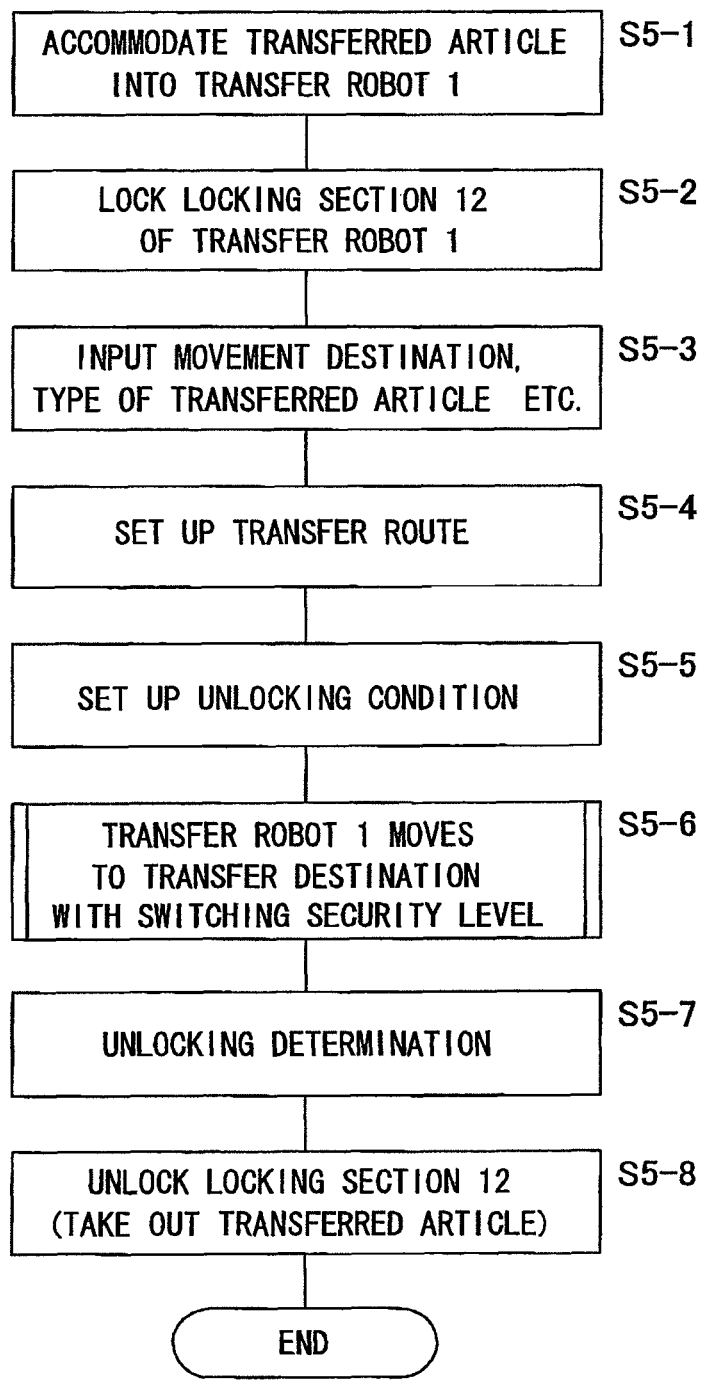
FIG. 5 is a flow chart of an example of transfer flow in a first embodiment of the present invention.

Referring to the flow chart of FIG. 5, first, at step S5-1, the building manager at the building manager's office 4 accommodates a parcel under delivery service received from a delivery person into the accommodation section 11 of the transfer robot 1.

Then, at step S5-2, the locking section 12 of the accommodation section 11 in which the transferred object is accommodated is locked.

Then, at step S5-3, through the input interface section 16, the building manager inputs information concerning the transfer destination, the type of the transferred object, the unlocking condition, and the like.

Figure 6:
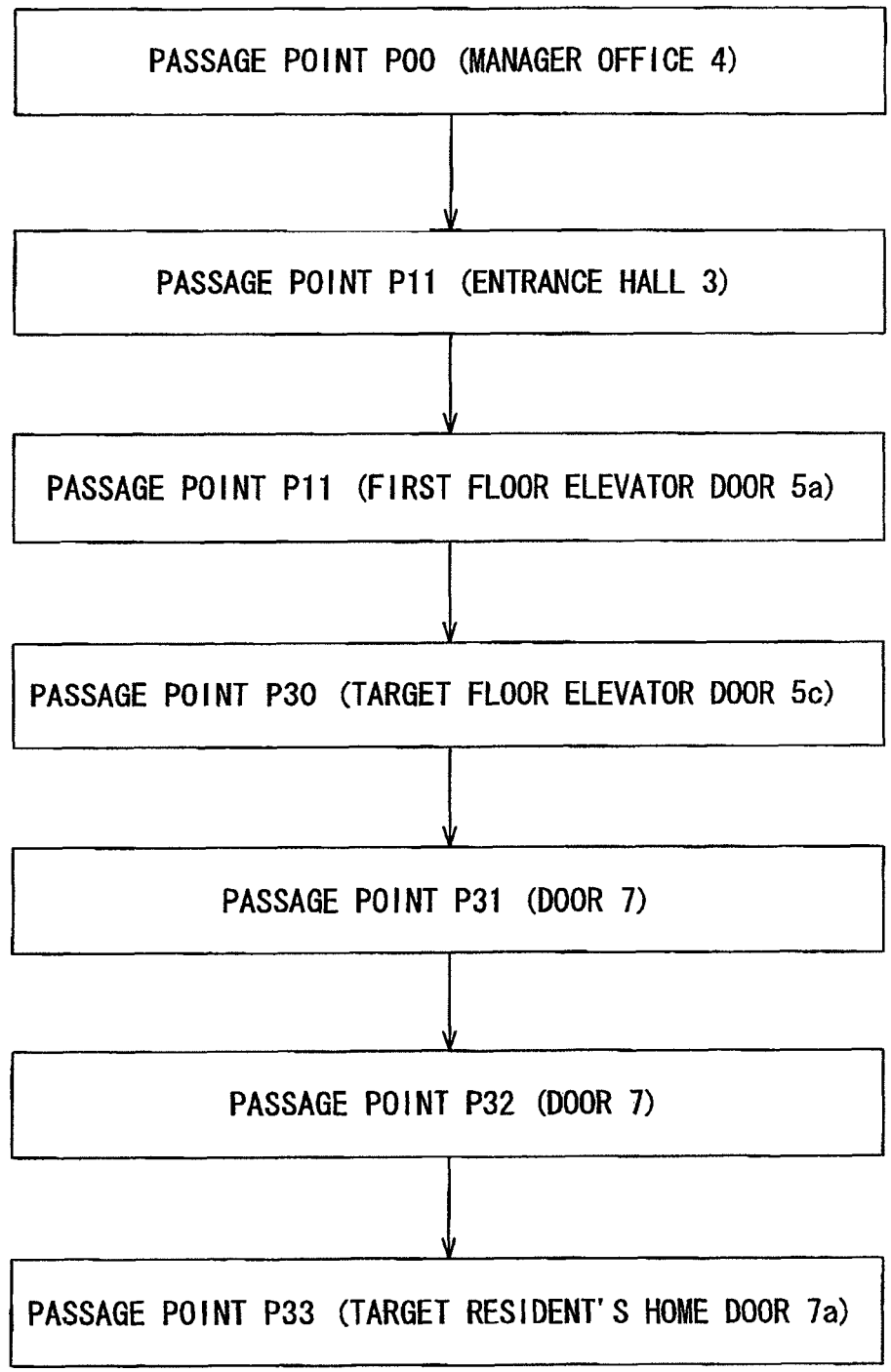
FIG. 6 is a schematic diagram of an example of passage points of a transfer robot in a first embodiment of the present invention.

At step S5-4, the transfer route setting, section 22 sets up a transfer route on the basis of the inputted transfer destination information, and then stores it to the transfer route storage section 23. FIG. 6 schematically shows the transfer route stored in the transfer route storage section 23. In the case of the transfer route R1 in FIG. 4, the transfer route storage section 23 sequentially stores a passage point P00 (the building manager's office 4), a passage point P11 (the entrance hall 3), a passage point P11 (the first floor elevator door 5a), a passage point P30 (the resident's floor elevator door 5c), a passage point P31 (a door 7), a passage point P32 (a door 7), and a passage point P33 (the target resident's home door 7a). With checking these passage points, the transfer robot 1 transfers the transferred object. Further, at step S5-5, the unlocking condition setting section 26 sets up an unlocking condition and then stores it into the unlocking condition storage section 27.

Then, at step S5-6, the transfer robot 1 moves to the transfer destination along the transfer route R1 stored in the transfer route storage section 23. At that time, the security level is switched in accordance with the zone level and the like.

Figure 7:
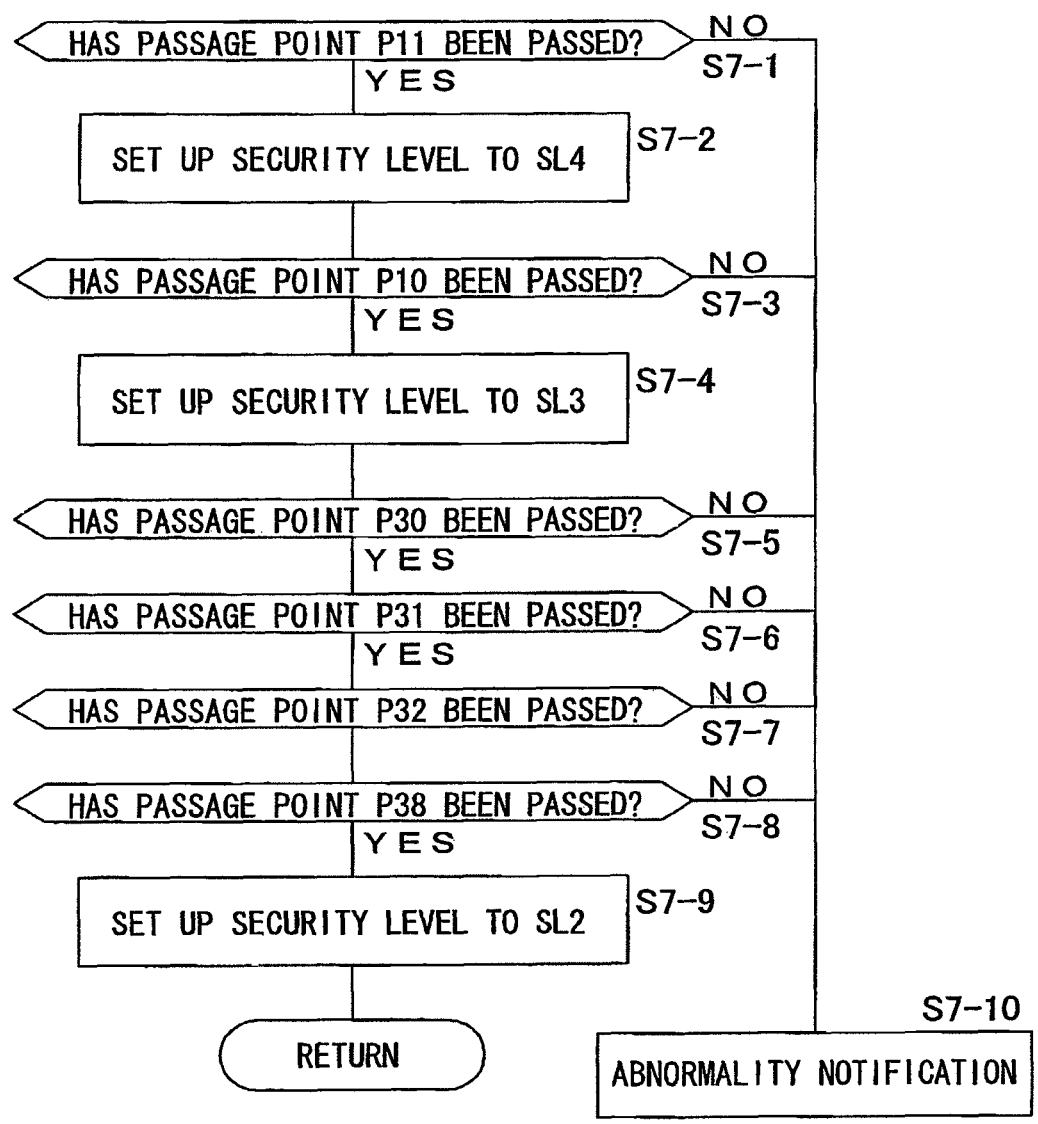
FIG. 7 is a detailed flow chart of step S5-6 in FIG. 5.

The operation of step S5-6 in which the transfer robot 1 moves to the transfer destination is described below with reference to FIG. 7.

At step S7-1, when the transfer robot 1 having left the building manager's office 4 arrives at the passage point P11 (the entrance hall 3), the security level is set up to SL4 (caution) in accordance with FIG. 3 at step S7-2.

Then, the transfer robot 1 arrives at the passage point P10 (the first floor elevator door 5a) via the entrance hall 3 at step S7-3, the security level is set up to SL3 (relatively safe) in accordance with FIG. 3 at step S7-4. The transfer robot 1 detects the arrival at the first floor elevator door 5a on the basis of the rotation information of the wheels obtained from the movement mechanism section 16. At that time, an image of the first floor elevator door 5a is acquired by the camera 13. When the elevator door marked as the first floor is image-acquired, the location can be identified more reliably. The image to be acquired is not limited to this image, as long as the scenery permits identification of the location. In addition to the image acquisition, the identification method for the location may be that the RF tag reader 14 receives information from an RF tag installed at the first floor elevator door 5a so as to detect the location. After detecting the arrival at the first floor elevator door, the transfer robot 1 gets in the elevator 5 through the elevator door. At the same time as getting in, the transfer robot 1 recognizes as having got in the elevator 5. The method of recognizing this may be, for example, based on the opening and the closing of the door of the elevator 5. After that, the transfer robot 1 moves to the target floor by the elevator 5. Then, when arriving at the target floor, the transfer robot 1 gets off the elevator 5.

The transfer robot 1 controls the elevator 5 by wireless communication through the communication section 33, then gets in the elevator 5, then operates it so as to move to the target floor. Further, the transfer robot 1 detects the arrival at the target floor on the basis of communication with the elevator 5. The transfer robot 1 may control the elevator 5 by another method.

Then, at step S7-5, the transfer robot 1 having got off the elevator 5 detects the passage point P30 (arrival at the elevator door 5c of the target floor) on the basis of the rotation information of the wheels obtained from the movement mechanism section 16. Here, the arrival at the elevator door 5c of the target floor is recognized by the same method as the case of arrival at the first floor elevator door 5a. The transfer robot 1 having recognized the arrival at the elevator door of the target floor moves through the passage 6 along the transfer route R1, then passes the passage points P31 and P32, then arrives at the passage point P33 (the door 7a of the target resident A home) (steps S7-6 to S7-8). The transfer robot 1 detects the arrival at the door 7a of the target resident A home on the basis of the rotation information of the wheels obtained from the movement mechanism section 24. Employable methods of determining the arrival at the door 7a of the target resident A home include: a method that an image of the door 7a of the target resident A home: is acquired by the camera 13; and a method that the RF tag reader 14 receives information from an RF tag installed at the door 7a of the target resident A home so as to detect the location.

After detecting the arrival at the door 7a of the target resident A home, the transfer robot 1 calls the resident A. The means for calling the resident A may be notification to an interphone at the door 7a of the resident A home by means of a radio signal through the communication section 33. However, the present invention is not limited to this. When the resident A having been called opens the front door, the transfer robot 1 enters into the door 7a. After that, at step S7-9, the security level is set up to SL2 (relatively safe) in accordance with FIG. 3.

At steps S7-1, S7-3, and S7-5 to S7-8, when arrival at the passage point is not detected in a time defined beforehand, the occurrence of abnormality is notified from the abnormality transmitting section 31 to the building manager's office 4 at step S7-10.

Then, at step S5-7 in FIG. 5, unlocking determination is executed in accordance with the security level. In this example, the security level at the time of delivery of the parcel under delivery service is SL2 (relatively safe). Thus, the transfer robot 1 acquires an image of the resident A face through the camera 13, and then compares the image with an image registered beforehand in the unlocking condition storage section 27. When the images agrees with each other, the unlocking determination section 28 unlocks the locking section 12 in the accommodation section 11 at step S5-8, so that the resident A is allowed to take out the parcel under delivery service. In addition to the comparison of a face image, employable methods of identifying the resident A include: comparison of a password inputted through the input interface section 16; and comparison by bio recognition based on a fingerprint detected by the fingerprint sensor 17.

When meeting with the target resident A in the passage 6 during the transfer, the transfer robot 1 may check that the person is the target resident A by using the camera 13 or the like, and then may perform delivery. Nevertheless, this location (the passage 6) is at security level SL3 (caution) in FIG. 3. Thus, in addition to the comparison of the image and a password described above, authentication for the resident A is performed using additional authentication means, so that the parcel under delivery service is delivered at a security level higher than SL2. The additional authentication means may be, for example, unlocking by using the key of the resident A front door.

Next, the operation of the transfer robot 1 is described for a case that the transfer robot 1 having left the building manager's office 4 transfers baggage from an automobile parked in the parking lot 9 to the door 7a of the resident A home. The dash-double dotted line R2 in FIG. 4 indicates a transfer route of the transfer robot 1 of this case. On this transfer route R2, the transfer robot 1 leaves the building manager's office 4, then passes the entrance hall 3, and then arrives at the parking lot 9. Then, after baggage is loaded, the transfer robot 1 passes the entrance hall 3 again. Then, the transfer robot 1 rides the elevator 5 so as to move to the floor (the third floor) where the door 7a of the resident A home is located. After that, the transfer robot 1 gets off the elevator 5 and then passes along the passage 6 so as to transfer automatically the transferred object to the door 7a of the resident A home.

Figure 8:
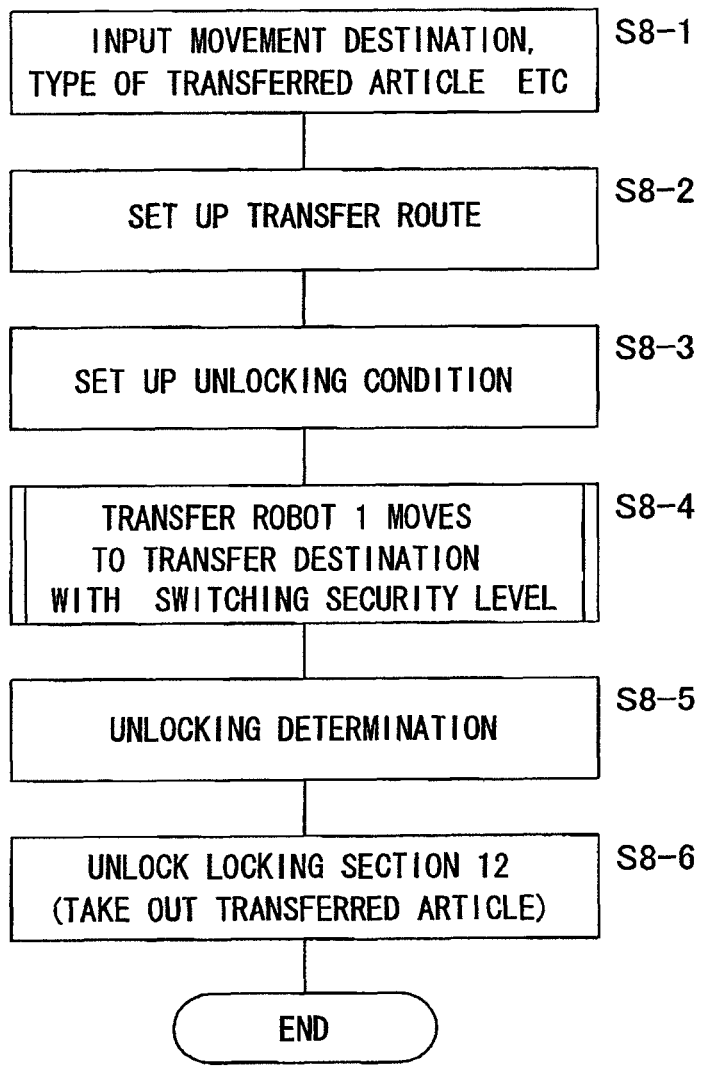
FIG. 8 is a flow chart of another example of transfer flow in a first embodiment of the present invention.

First, at step S8-1 in FIG. 8, the building manager inputs necessary instruction including the transfer destination and the type of the transferred object, and the like, to the transfer robot through the input interface section 16. Further, at step S8-2, the transfer route setting section 22 sets up a transfer route R2, and then stores it into the transfer route storage section 23. Further, at step S8-3, the unlocking condition setting section 26 sets up an unlocking condition and then stores it into the unlocking condition storage section 27.

Figure 9:
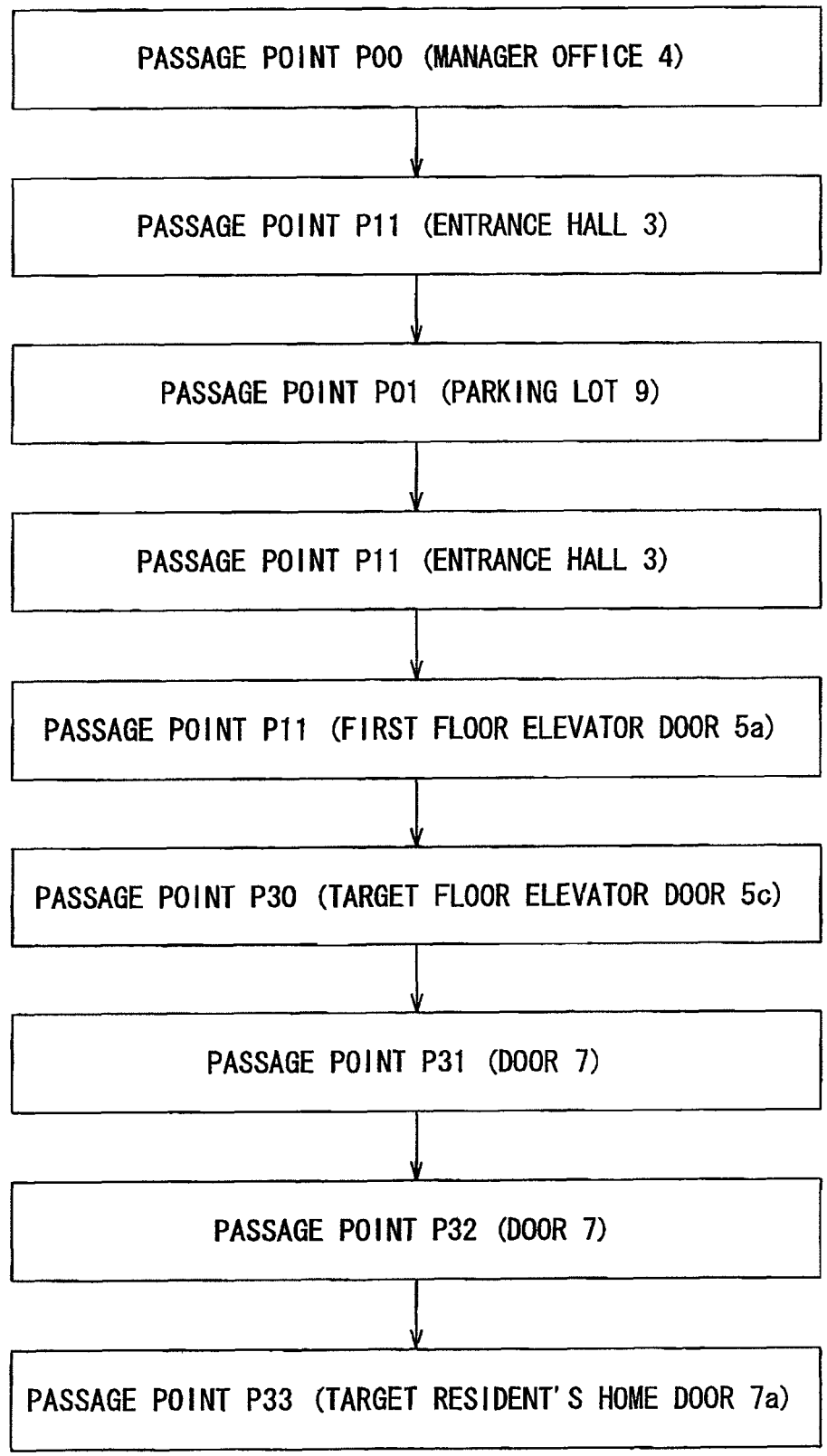
FIG. 9 is a schematic diagram of another example of passage points of a transfer robot in a first embodiment of the present invention.

FIG. 9 schematically shows the transfer route stored in the transfer route storage section 23. In the case of the transfer route R2 in FIG. 4, the transfer route storage section 23 sequentially stores a passage point P00 (the building manager's office 4), a passage point P11 (the entrance hall 3), a passage point P01 (the parking lot 9), a passage point P11 (the entrance hall 3), a passage point P11 (the first floor elevator door 5), a passage point P30 (the resident's floor elevator door 5c), a passage point P31 (the door 7), a passage point P32 (the door 7), and a passage point P33 (the target resident's home door 7a). With checking these passage points, the transfer robot 1 transfers the transferred object.

At step S8-4 in FIG. 8, the transfer robot 1 moves to the transfer destination along the transfer route R2 having been stored. At that time, the security level is switched in accordance with the zone level and the like.

In the case of this transfer route R2, no transferred object is accommodated in the accommodation section 11 at the beginning of transfer. Thus, the security level is SL0 (no level) in accordance with FIG. 3.

Figure 10:
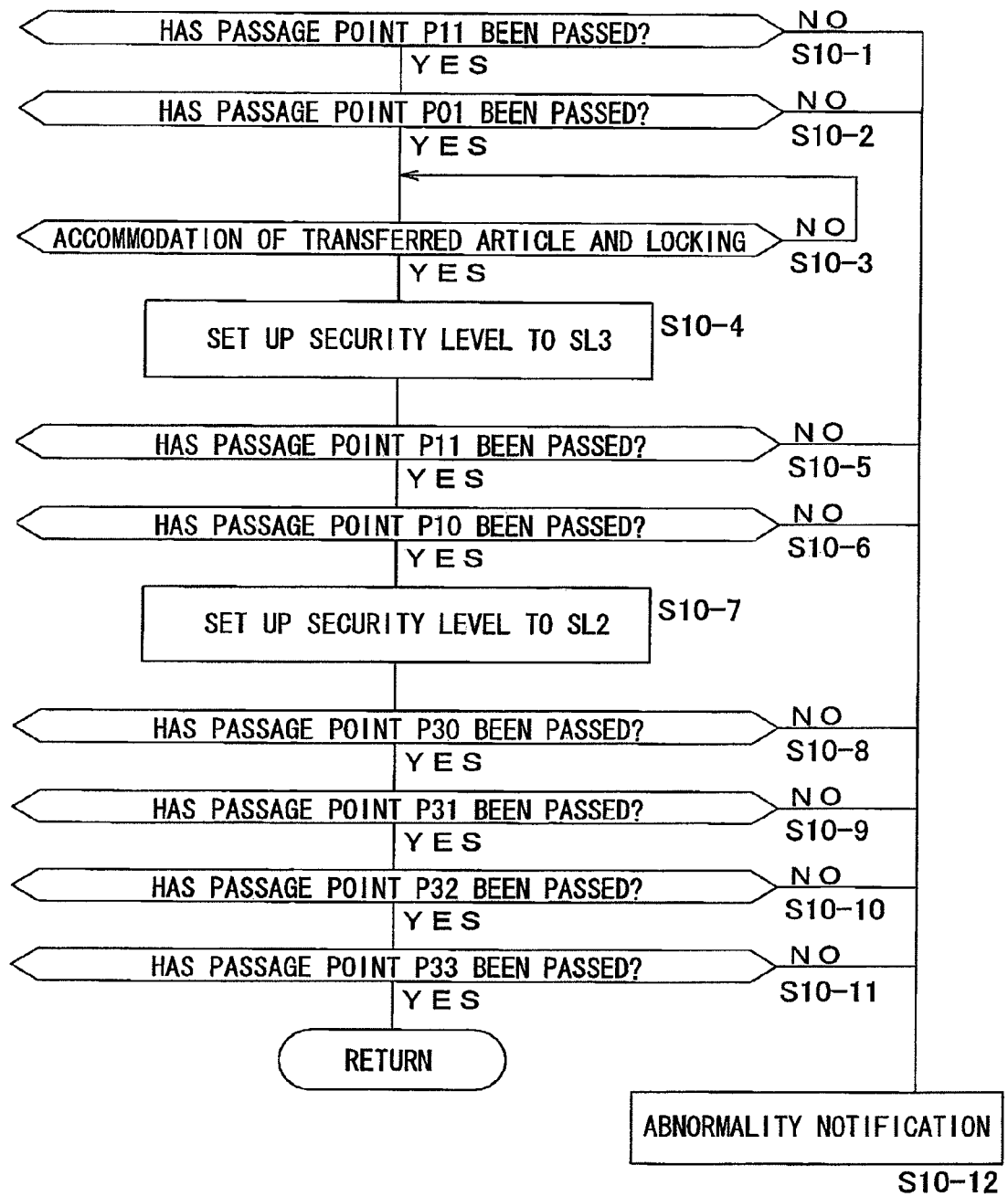
FIG. 10 is a detailed flow chart of step S8-4 in FIG. 8.

As shown in FIG. 10, with checking the passage of the passage points P11, P01, P11, P10, P30, P31, P32, and P33, the transfer robot 1 continues movement (steps S10-1, S10-2, S10-5, S10-6, and S10-8 to S10-11). When arrival at the passage point is not detected in a time defined beforehand, the occurrence of abnormality is notified from the abnormality transmitting section 31 to the building manager's office 4 at step S10-12.

When leaving the entrance hall 3 and then arriving at the parking lot 9, the transfer robot 1 allows the resident A to accommodate a transferred object into the accommodation section 11 (steps S10-1 to S10-3). At that time, on the basis of an image by the camera 13 or the like, it is determined whether the person is the correct resident A who should receive the transferred object. Further, when the transferred object (baggage) is accommodated into the accommodation section 11, the transfer robot 1 sets up the security level in accordance with FIG. 3 (step S10-4). In this case, a transferred object of a resident A is accommodated in the parking lot 9. Further, the resident A serves an accompanying person. Thus, SL3 (caution) is concluded in accordance with FIG. 3, so that the corresponding security level is adopted. Further, when detecting the arrival at the passage point P10 (getting in the elevator 5), the transfer robot 1 sets the security level into SL2 (relatively safe) in accordance with FIG. 3 (steps S10-6 and S10-7). After arriving at the door 24a of the resident A home (steps S10-8 to S10-11) via the elevator hall 5c on the third floor, the transfer robot 1 authenticates the resident A again on the basis of image information from the camera or the like. Then, when the authentication is successful, the locking section is unlocked so that the resident A is allowed to take out the transferred object (steps S8-5 and S8-6 in FIG. 8).

Second Embodiment

Figure 11:
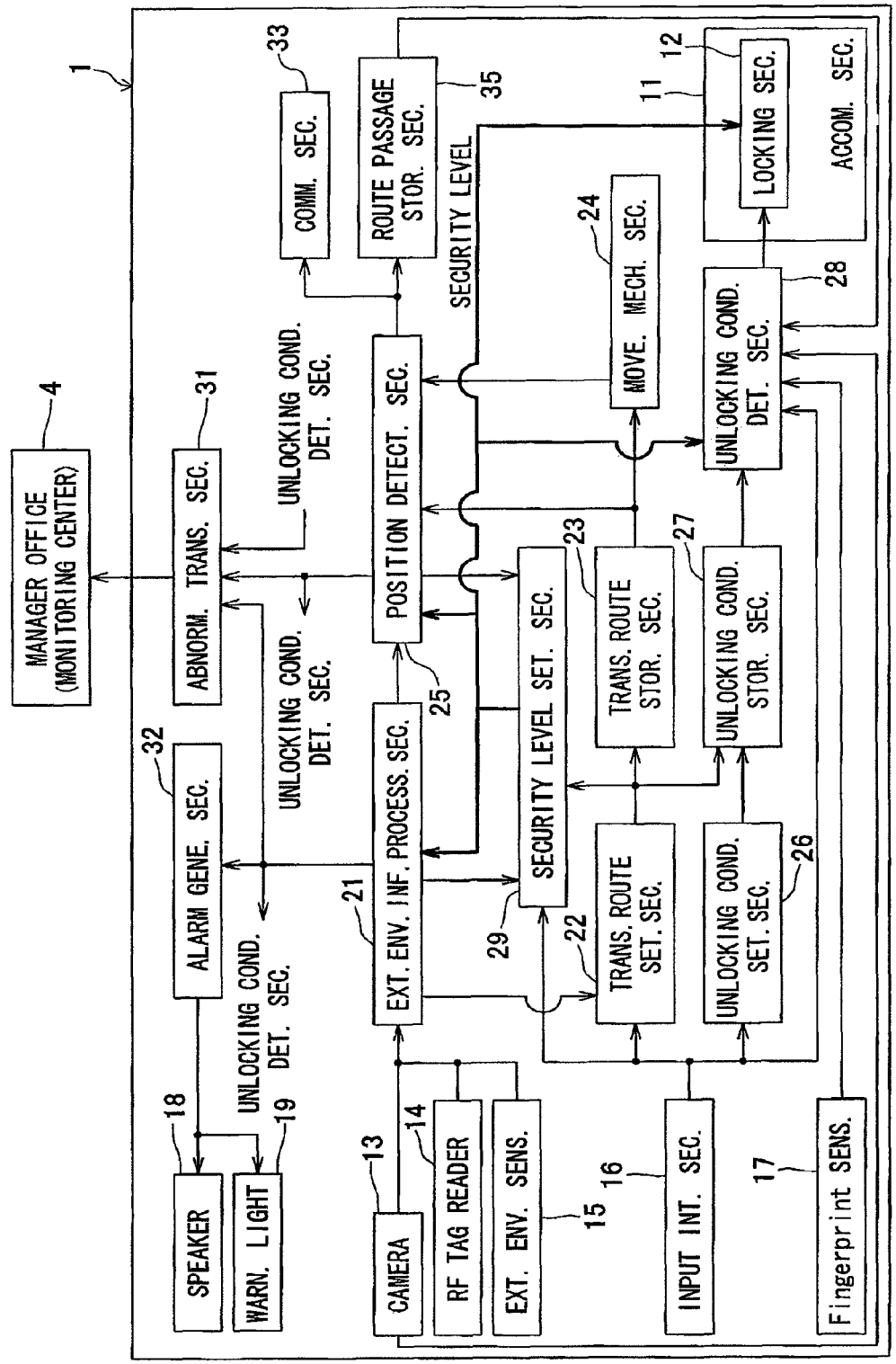
FIG. 11 is a functional block diagram of a transfer robot according to a second embodiment of the present invention.

FIG. 11 shows a transfer robot 1 capable of autonomous movement according to a second embodiment of the present invention. In the present embodiment, the transfer robot 1 has a route passage storage section 35. In the course that the transfer robot 1 moves from a transfer origin to a transfer destination along a transfer route, passage of the passage points P00 to P34 detected by the position detecting section 25 is stored into the route passage storage section 35. In other words, the route passage storage section 35 stores the passage state of the passage points P00 to P34.

FIG. 12 schematically shows an example of the method of storing the passage state of the passage points performed by the route passage storage section 35. In FIG. 12, the vertical axis indicates the floor number, while the horizontal axis indicates the home number. Symbol A in FIG. 12 indicates that the floor number is P2 and that the door number is 1. Thus, the location number in the condominium 2 is P21, and this indicates the door of the first home on the second floor. Further, symbol B indicates that the floor number is P1 and the door number is 0. Thus, P10 is obtained, and this indicates the first floor elevator door 5a. The method of storing FIG. 12 may be an electric method employing an IC memory or the like, or alternatively a mechanical method like a keyhole.

The operation of the transfer robot 1 of the present embodiment is described below for an exemplary case that a parcel under delivery service is transferred from the building manager's office 4 to the door 7a of a resident A home without an accompanying person (see the dash-dotted line R1 in FIG. 4 and see FIG. 6). The overall operation is similar to that in the case of moving along the same transfer route R1 in the first embodiment (see FIG. 5). The building manager instructs the transfer robot 1 to transfer a parcel under delivery service to the door 7a of the resident A home. A transfer route having been set up by the transfer route setting section 22 is stored into the transfer route storage section 23. An unlocking condition having been set up by the unlocking condition setting section 26 is stored into the unlocking condition storage section 27. Further, in the present embodiment, for the purpose of determination of the unlocking condition described later, the transfer route is stored also in the unlocking condition storage section 27.

Figure 13A:
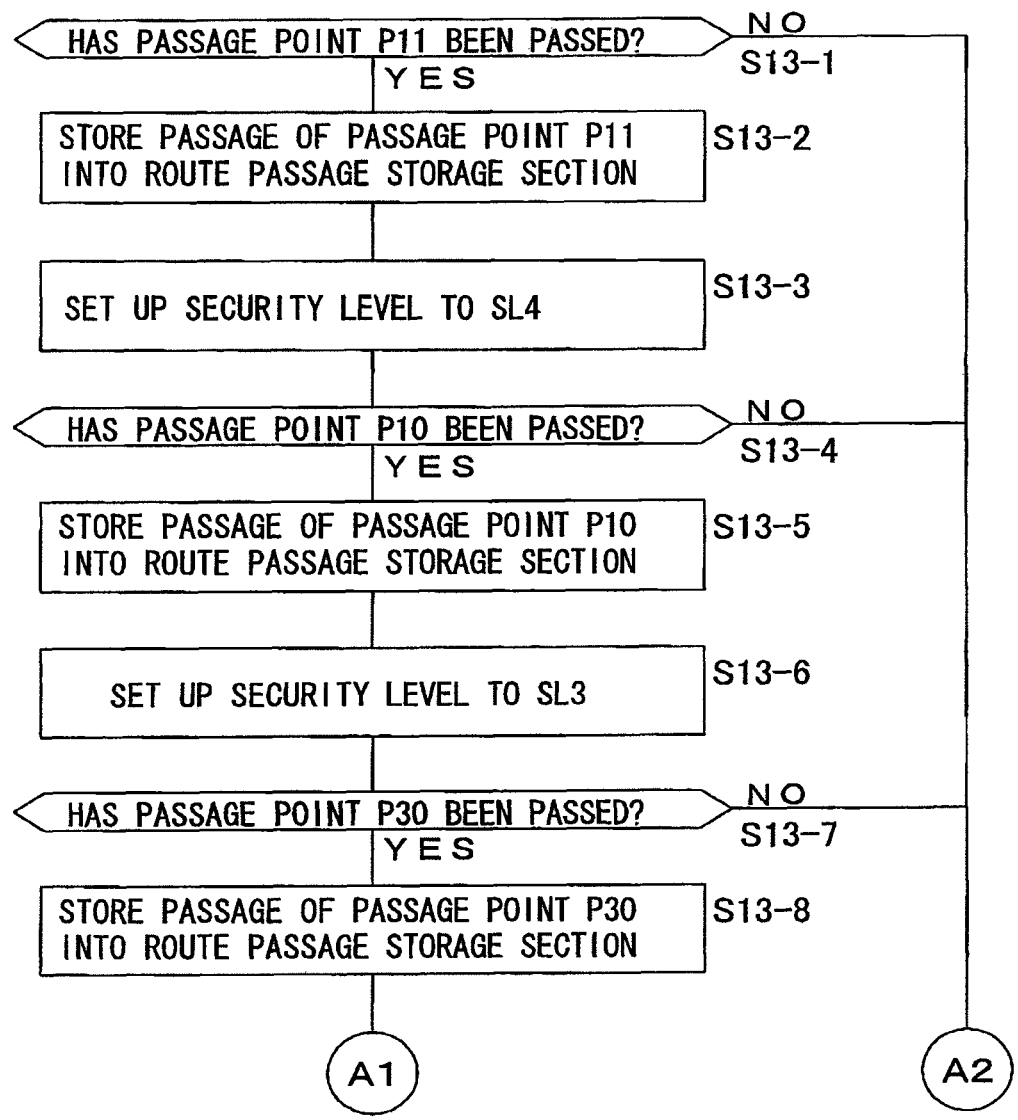
FIGS. 13A and 13B are a flow chart of an example of transfer flow in a second embodiment of the present invention.
Figure 13B:
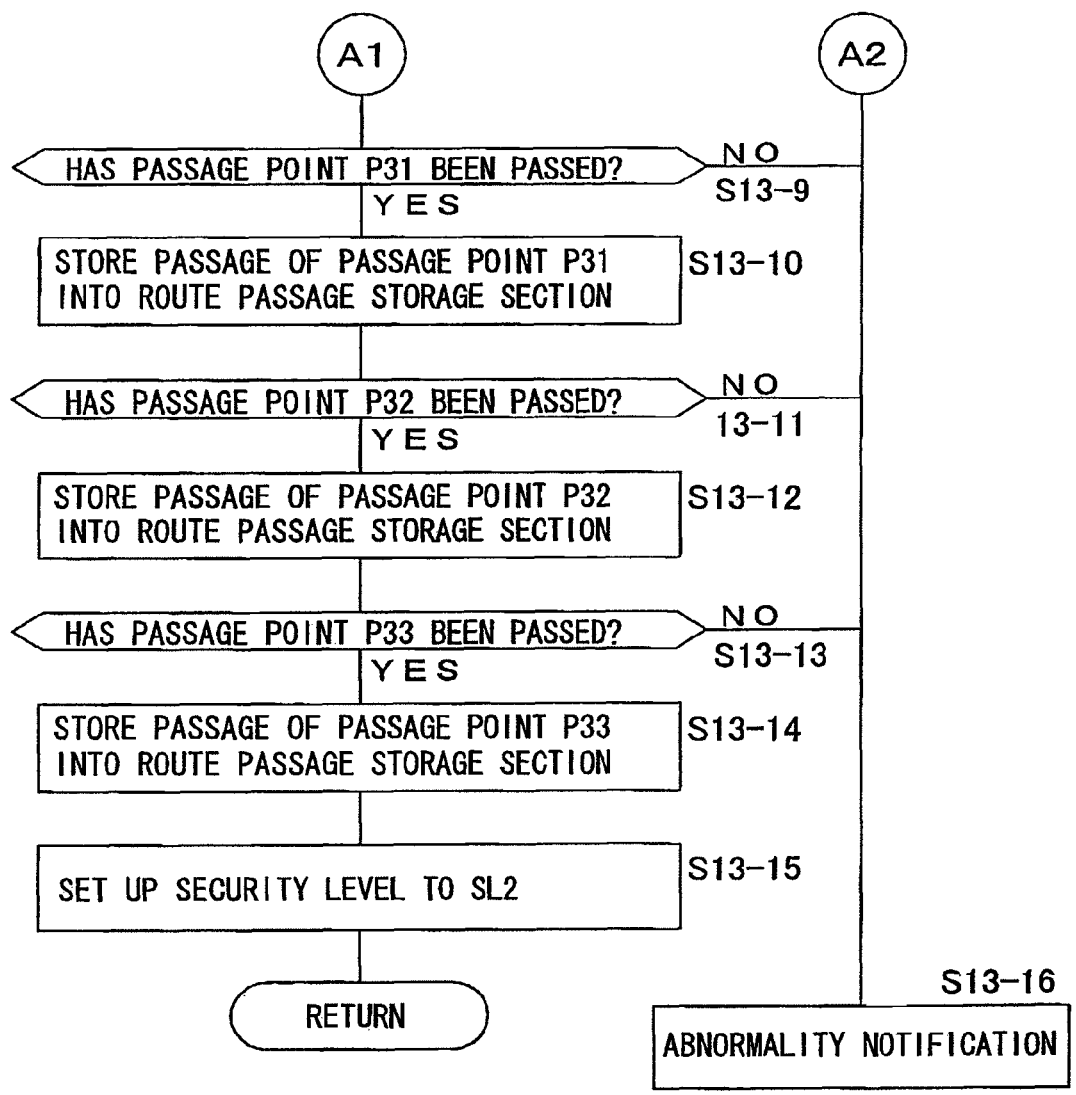

As shown in FIGS. 13A and 13B, with checking and recording the passage points and switching the security level when the situation is in accordance, the transfer robot 1 moves to the transfer destination. Specifically, at steps S13-1, S13-4, S13-7, S13-9, S13-11, and S13-13, when passage of the passage points P11, P10, P30, P31, P32, and P33 is detected, the passage of the passage points is recorded into the route passage storage section 35 at steps S13-2, S13-5, S13-8, S13-10, S13-12, and S13-14. In the present embodiment, passage of a passage point is stored by count-up using a table as shown in FIG. 12. Further, at steps S13-3, S13-6, and S13-15, the security level is switched similarly to the case of the first embodiment. When abnormality arises in the transfer, abnormality notification is performed. This point is also similar to the first embodiment (step S13-16).

FIG. 14 shows the state of the route passage storage section 35 at the time of arrival at the transfer destination (the door 7a of the resident A home) in a case that the transfer has been performed normally. In FIG. 14, symbol I indicates that the passage point is passed once (symbol II indicates that the passage point is passed twice). Thus, it is indicated that the passage point P00 (the building manager's office 4), the passage point P11 (the entrance hall 3), the passage point P10 (the first floor elevator door 5a), the passage point P30 (the third floor elevator door 5c), the passage points P31 and P32, and the passage point P33 (the door 7a of the resident A home) are each passed once. Before the beginning of transfer, since the route passage storage section 35 has not yet passed any point, no mark indicating the passage is stored.

When the transfer robot 1 arrives at the door 7a of the resident A home, the unlocking determination section 28 determines the unlocking condition (see steps S5-7 and S5-8 in FIG. 5). At that time, the unlocking determination section 28 compares the state of the route passage storage section 35 with the transfer route stored beforehand in the unlocking condition storage section 27. In this example, since the state of the route passage storage section 35 agrees with the transfer route stored beforehand in the unlocking condition storage section 27, when determination of the other unlocking conditions is successful, the locking section 12 is unlocked. When the transfer route stored in the unlocking condition storage section 27 does not agree with the state of the route passage storage section 35, the unlocking determination section 28 determines that unlocking is not permitted. Similarly to the first embodiment, a combination with other conditions (such as biometrics for the resident A and password input) other than the agreement between the route passage storage section 35 and the unlocking condition storage section 27 is determined depending on the security level.

Figure 4:
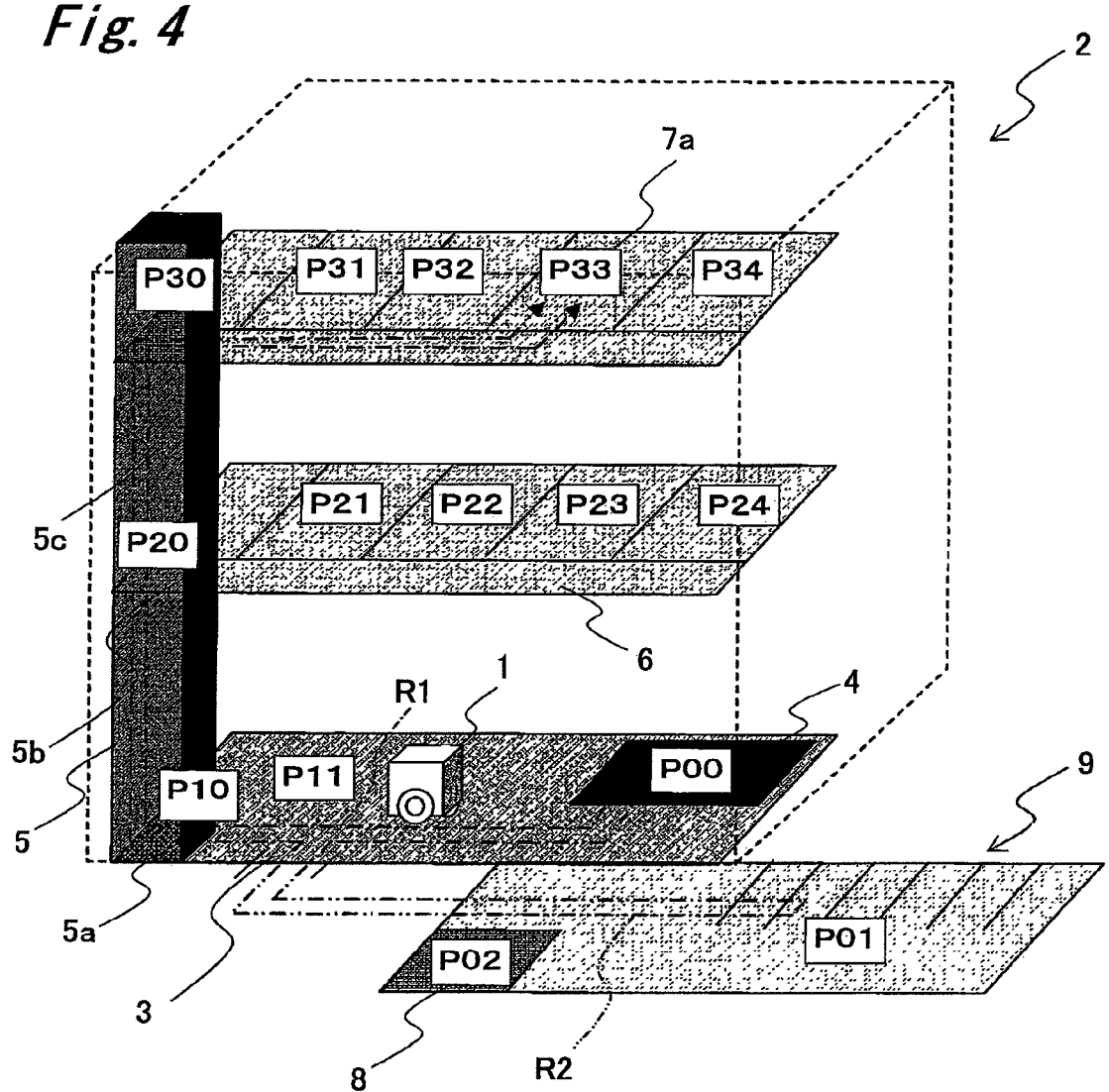
FIG. 4 is a schematic diagram of a transfer route in a first embodiment of the present invention.

Next, description is given for a case that the transfer route setting section 22 has set up a transfer route indicated by the dash-dotted line R1 in FIG. 4 and by FIG. 6 but that the transfer has not normally performed.

For example, in a case that by any reason, the transfer robot 1 temporarily gets off the elevator 5 at the second floor, then passes the front of the first home on the second floor, then returns back into the elevator 5, then gets off at the third floor, and then arrives at the resident A home, the data in the route passage storage section 35 is as shown in FIG. 15. Further, in a case that by any reason, the transfer robot 1 gets off the elevator 5 at the third floor and moves to the door 7a of the resident A home, but goes back from the front of the first home on the third floor, then passes the front of the third floor elevator, and then arrives at the resident A home, the data in the route passage storage section 35 is as shown in FIG. 16.

In each of the cases of FIGS. 15 and 16, the transfer route stored in the unlocking condition storage section 27 disagrees with the states of the transfer route storage section 23. Thus, the unlocking determination section 28 determines that unlocking is not permitted.

Next, the operation of the transfer robot 1 of the present embodiment is described for a case that the transfer robot 1 having left the building manager's office 4 transfers baggage from an automobile parked in the parking lot 9 to the door 7a of the resident A home (see the dash-double dotted line R2 in FIG. 4 and see FIG. 9). The overall operation is similar to that in the case of moving along the same transfer route R2 in the first embodiment (see FIG. 8).

Figure 17A:
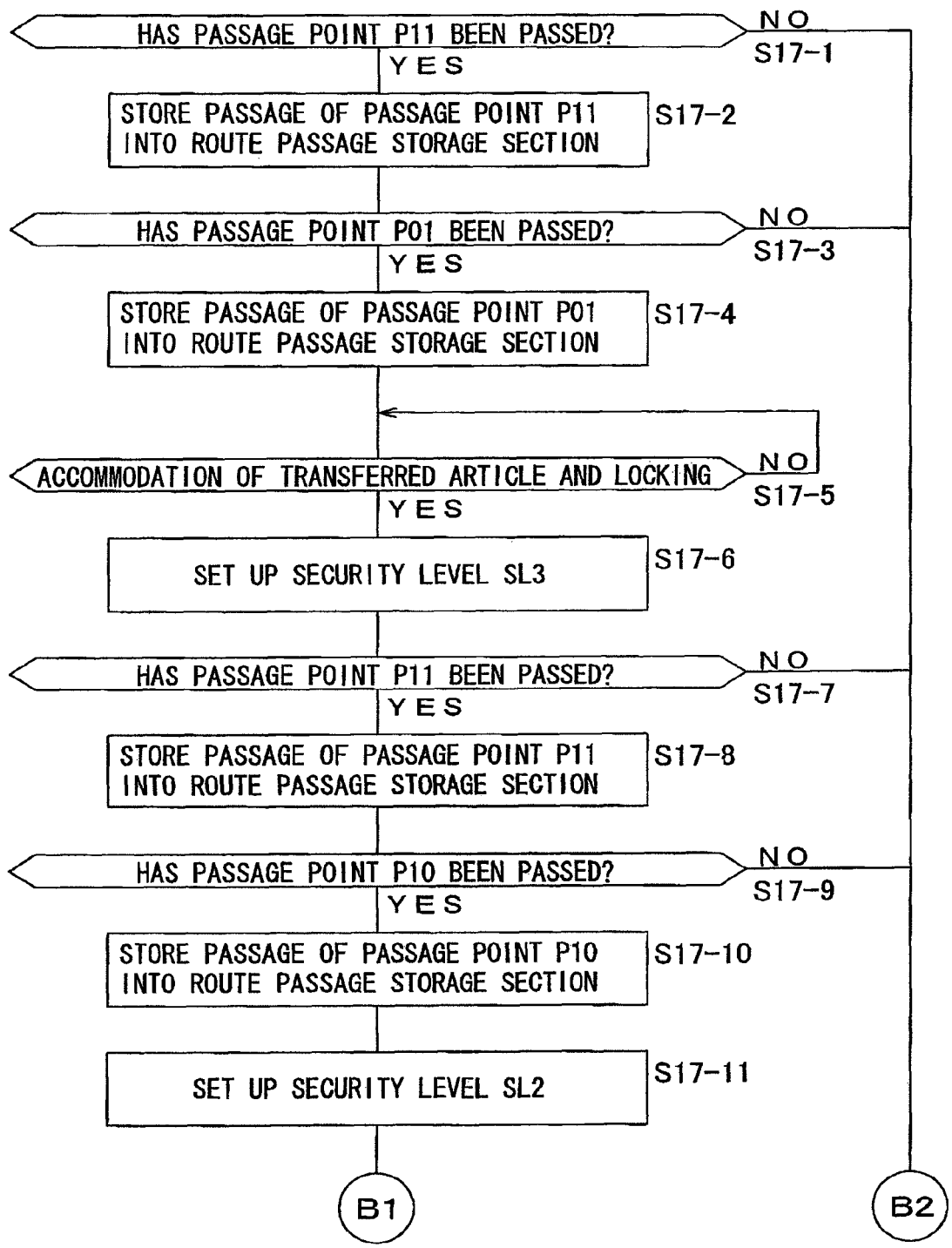
FIGS. 17A and 17B are a flow chart of an example of transfer flow in a second embodiment of the present invention.
Figure 17B:
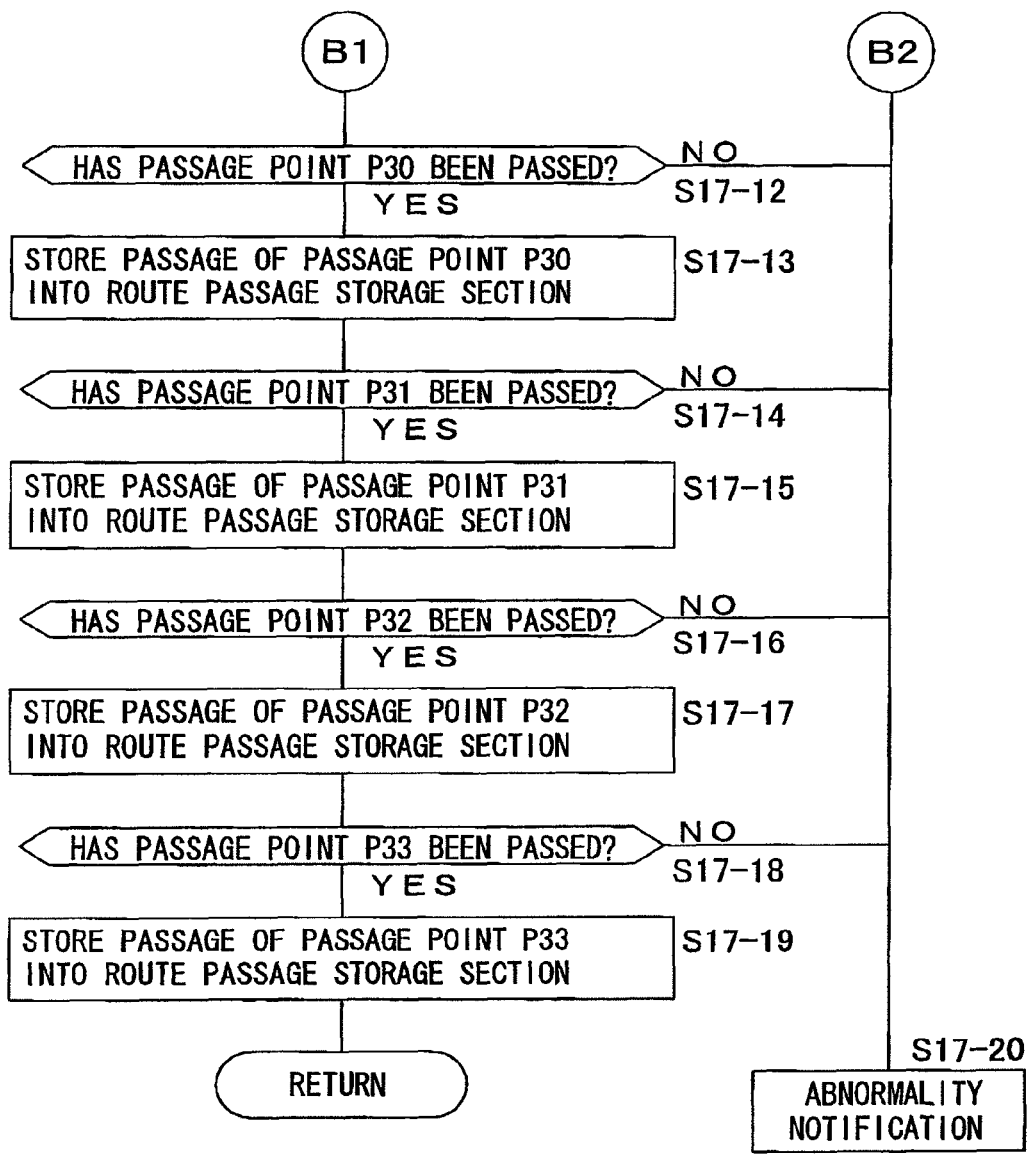

As shown in FIGS. 17A and 17B, with checking and recording the passage points and switching the security level when the situation is in accordance, the transfer robot 1 moves to the transfer destination. Specifically, at steps S17-1, S17-3, S17-7, S17-9, S17-12, S17-14, S17-16, and S17-18, when passage of the passage points P11, P01, P11, P10, P30, P31, P32, and P33 is detected, the passage of the passage points is recorded into the route passage storage section 35 at steps S17-2, S17-4, S17-8, S17-10, S17-13, S17-15, S17-17, and S17-19. Further, at steps S17-6 and S17-11, the security level is switched similarly to the case of the first embodiment. When abnormality arises in the transfer, abnormality notification is performed (step S17-19).

FIG. 18 shows the state of the route passage storage section 35 at the time of arrival at the transfer destination (the door 7a of the resident A home) in a case that the transfer has been performed normally. It is recorded that the passage point P00 (the building manager's office 4), the passage point P01 (the parking lot 9), the passage point P10 (the first floor elevator door 5a), the passage points P31 and P32, and the passage point P33 (the door 7a of the resident A home) have each been passed once, and that the passage point P11 (the entrance hall 3) has been passed twice. When the transfer robot 1 arrives at the door 7a of the resident A home, the unlocking determination section 28 determines the unlocking condition (see steps S8-5 and S8-6 in FIG. 8). At that time, the unlocking determination section 28 compares the state of the route passage storage section 35 with the transfer route stored beforehand in the unlocking condition storage section 27. In this example, since the state of the route passage storage section 35 agrees with the transfer route stored beforehand in the unlocking condition storage section 27, when determination of the other unlocking conditions is successful, the locking section 12 is unlocked.

The method of checking each location performed by the route passage storage section 35 is not limited to count-up, and may be implemented by count-down. Further, the count-up and the count-down may be performed with taking into consideration the direction of passage at each location. For example, at the time of getting in the elevator at the elevator door, count-up may be performed. Then, at the time of getting off the elevator, count-down may be performed. At the time of arriving at the door of each resident's home, count-up may be performed. At the time of leaving (departing), count-down may be performed. Alternatively, at the time of passing each location, count-up may be performed in the case of approaching the destination, while count-down may be performed in the case of departing from the destination. These methods may be adopted appropriately depending on the situation of transfer and the contents and the importance of the transferred object, so that flexible operation is achieved.

The other configuration and operation of the second embodiment are similar to those of the first embodiment. Thus, like elements are designated by like reference numerals, and their description is omitted.

The unlocking condition storage section 27 need not necessarily be built in the transfer robot 1 main body, and may be held by a resident in a state of being separated from the transfer robot 1 main body. The resident may hold the unlocking condition storage section 27 like a key, and may set the unlocking condition storage section 27 into the robot when a transferred object has been brought by the robot. Alternatively, transmission to the unlocking determination section 28 of the transfer robot 1 may be performed through wireless communication means or the like, so that comparison check may be performed with the route passage storage section 35 of the transfer robot 1. This improves the security level further.

Figure 19A:
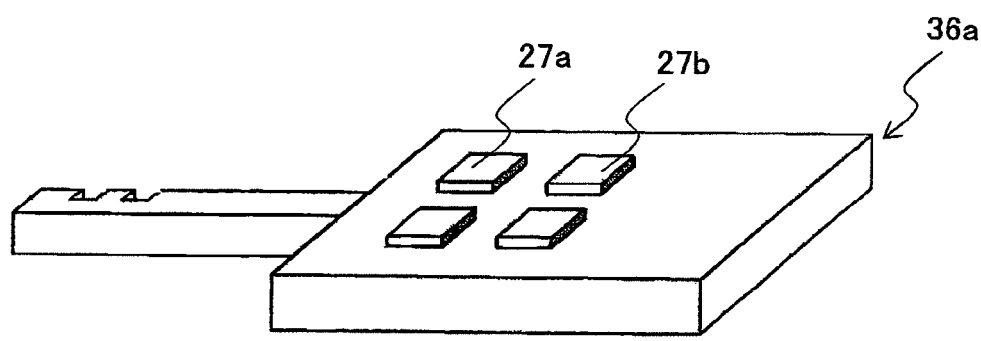
FIG. 19A is a schematic perspective view showing an example of an unlocking key.
Figure 19B:
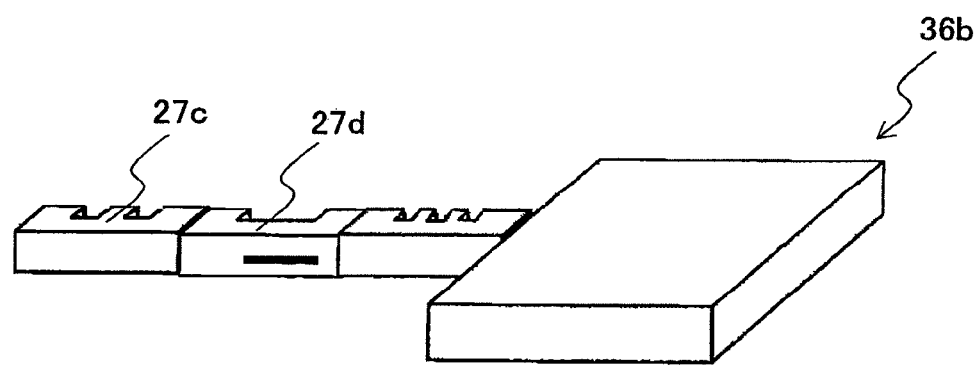
FIG. 19B is a schematic perspective view showing another example of an unlocking key.

FIGS. 19A and 19B show examples of an unlocking condition storage section constructed in the form of being separated from the transfer robot 1.

In FIG. 19A, in an unlocking key 36a, an unlocking condition storage section 27a and an unlocking condition storage section 27b that store unlocking conditions as data are attached in the form of removable chips. Then, whether the unlocking key 36a actually acts or not is controlled in accordance with the data of the unlocking conditions saved in these attached unlocking condition storage sections 27a and 27b. When this unlocking key 36a is employed, a key is obtained that permits control with complicated conditions.

In FIG. 19B, in an unlocking key 36b, an unlocking condition storage section 27c and an unlocking condition storage section 27d in which unlocking conditions are formed structurally serve as the teeth of a removable key. Then, whether the unlocking key 36b actually acts or not is controlled in accordance with the structure of the these attached unlocking condition storage sections 27c and 27d. When this unlocking key 36b is employed, a key is obtained that can hardly be duplicated.

The configurations shown in FIGS. 19A and 19B may be employed not only in the present embodiment but also in the above-mentioned first embodiment and a later-described third embodiment.

Third Embodiment

Figure 22:
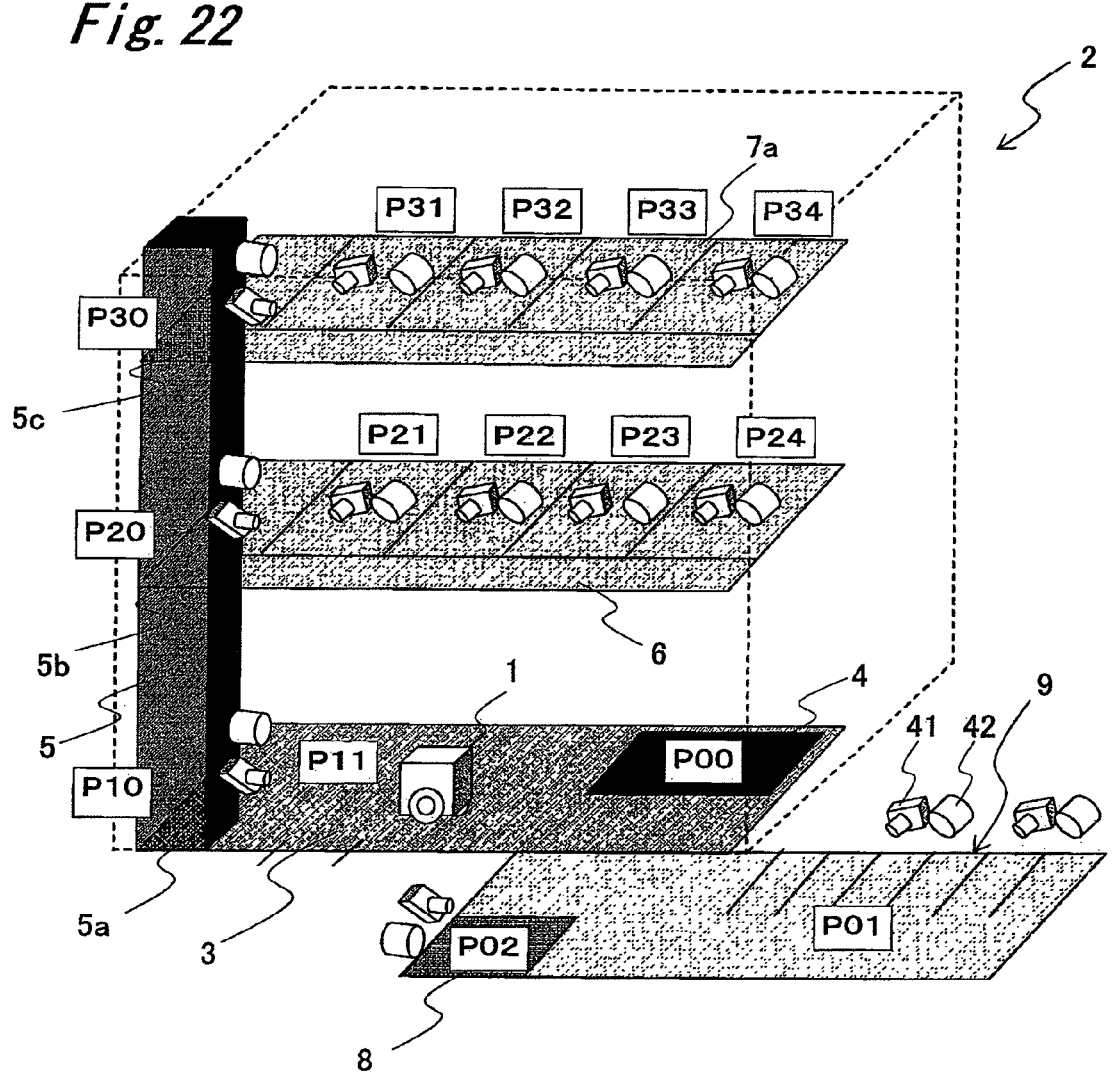
FIG. 22 is a schematic diagram showing a structure of a condominium in a third embodiment of the present invention.

FIGS. 20 and 22 show an automatic transfer system according to a third embodiment of the present invention. This automatic transfer system comprises: a transfer robot 1 that has an accommodation section 11 for a transferred object and performs transfer; an environment monitoring device 43 for monitoring the presence or absence of a suspicious person, the presence or absence of an obstacle, and the like on the running route of the transfer robot 1 by using a monitoring camera 41 and a monitoring sensor 42 (such as an infrared sensor, an ultrasonic sensor, and a laser sensor); a task and unlocking condition setting device 44 for setting up into the transfer robot 1a transfer tasks such as a transfer route as well as an unlocking condition for the accommodation section 11; and an unlocking condition input device 45 which forms a pair with the task and unlocking condition setting device 44 and to which an unlocking condition for the accommodation section 11 is inputted at the time of task completion. Further, in this automatic transfer system, similarly to the first embodiment, when the transfer robot 1 or the environment monitoring device 43 detects abnormality (e.g., a case that unlocking processing not satisfying the unlocking condition is performed and a case that the transfer route is blocked by a suspicious person who causes a security problem), the transfer robot 1 notifies to the building manager's office 4 serving as a monitoring center.

The environment monitoring device 43 has a route environment detecting section 46 for notifying, to the security level setting section 29 of the transfer robot 1, route environment information obtained from the input from the monitoring camera 41 or the monitoring sensor 42. Here, information of the task and unlocking condition setting device 44 is sent to the transfer route storage section 23 and the unlocking condition storage section 27. Then, the transfer route and the unlocking condition in the transfer task instructed by the task and unlocking condition setting device 44 are added.

The transfer robot 1 executes a transfer task, for example, as described below. The transfer robot 1 is called by a resident 300 who has the task and unlocking condition setting device 44. Then, the resident 300 loads a transferred object, and instructs transfer to a destination location. The transfer robot 1 transfers the transferred object. At the destination, the transferred object is transferred to a resident 301 who has the unlocking condition input device 45, so that the transfer task is completed. During the transfer, the transfer robot 1 locks the accommodation section 11 so as to prevent theft and intercept of the transferred object by a malicious third person. Here, examples of the transfer task include: (1) a resident who stays in a room is to carry dust to the garbage shed 8; (2) a resident in the parking lot 9 is to carry, to a room, baggage taken down from an automobile; (3) the building manager is to transfer to a resident a parcel having been kept; and (4) a circular notice is to be passed around.

A series of processing performed by the transfer robot 1 in task execution includes in general the following Steps 1 to 5.

Step 1: a resident registers a task.

A destination, a transfer route, and an unlocking condition are inputted through the task and unlocking condition setting device 44. The transfer route is not only stored into the transfer route storage section 23, but also stored into the unlocking condition storage section 27 together with the unlocking condition. Similarly to the first embodiment, the transfer route may be inputted by the user directly to the transfer robot 1. Tasks each including a transfer route may be registered beforehand in the task and unlocking condition setting device 44 or the transfer robot 1 itself. Then, the resident may select a registered task.

Step 2: the resident loads baggage on the accommodation section 11, and then the transfer robot 1 performs locking.

Until the unlocking condition is satisfied, the accommodation section 11 is locked and hence the transferred object cannot be taken out. Further, when necessary, the inside of the accommodation section 11 may be made unseen so that it may be made impossible to know, from the outside, what the transferred object is.

Step 3: the transfer robot 1 runs to the destination.

The transfer robot 1 moves toward the destination on the basis of the information of the transfer route storage section 23. This transfer route may be a fixed transfer route. Alternatively, this route may be a transfer route selected by the transfer robot 1 on the basis of the information from the external environment information processing section 21 and the environment information from the route environment detecting section 46 of the environment monitoring device 43 with taking into consideration the security. Further, in the selection of a transfer route, a map stored in the transfer route storage section 23 may be used. Similarly to the first embodiment, the position detecting section 25 detects the position of the transfer robot 1. Then, in cases of deviation or the like from the transfer route, abnormality is notified from the abnormality transmitting section 31 to the building manager's office 4. The security level setting section 29 switches the security level with taking into consideration the environment information from the route environment detecting section 46. Further, the route environment detecting section 46 receives the security level from the security level setting section 29 and, on the basis of this, switches the mode of monitoring of the transfer route by the monitoring camera 41 or the monitoring sensor 42. For example, when the security level is high, the sampling rate is increased or the monitored area is expanded in the monitoring camera 41 and the monitoring sensor 42. When the security level is low, the sampling rate and the monitored area are reduced in the monitoring camera 41 and the monitoring sensor 42. Alternatively, the types or the number of the monitoring sensors 42 used in the monitoring are reduced. The switching of the security level is described later in detail.

Step 4: the transfer robot 1 arrives at the destination, and then the resident takes down the baggage.

After the transfer robot 1 arrives at the destination, when the unlocking condition is satisfied, the locking section 12 is unlocked so that the resident is allowed to take out the baggage. At that time, the unlocking condition is inputted through the unlocking condition input device 45.

Step 5: the transfer task is completed, and then the transfer robot 1 moves to a waiting position.

The transfer robot 1, the environment monitoring device 43, the task and unlocking condition setting device 44, and the unlocking condition input device 45 work as described above so that the transfer task is completed.

Next, description is given for the switching of the security level performed by the security level setting section 29 according to the present embodiment. FIG. 23 shows a decision table provided in the security level setting section 29 according to the present embodiment.

The security level setting section 29 sets up the security level on the basis of the conditions similar to those in the first embodiment, that is, the zone level to which the present position of the transfer robot 1 belongs, the presence or absence and the type of a transferred object, and the presence or absence of an accompanying person, with taking into consideration the environment information inputted from the route environment detecting section 46. Specifically, the security level is changed between a case that the route environment detecting section 46 detects a security problem such as the presence of a suspicious person in the vicinity and a case that no problem is detected. In each field in FIG. 23, two levels (/++) are set up. Then, when no problem is detected,  is selected (SL1 to SL5). When a problem is detected, ++ is selected (SL6 to SL10). Here, at SL6 to SL10, the unlocking conditions are made severe in addition to SL1 to SL5, so that the monitoring is strengthened. Further, the destination is defined as an X zone, so that input of an unlocking condition by using the unlocking condition input device 45 is required as an obligation.

For example, at SL6 to SL10, the following security setting is performed.

SL6: in addition to the condition of SL1, the sampling time of the route environment detecting section 46 is reduced.

SL7: in addition to the conditions of SL2, the sampling time of the route environment detecting section 46 is reduced.

SL8: in addition to the conditions of SL3, the sampling time of the route environment detecting section 46 is reduced, and the detection area of the monitoring camera 41 or the monitoring sensor 42 is expanded.

SL9: in addition to the conditions of SL4, the sampling time of the route environment detecting section 46 is reduced.

SL10: in addition to the conditions of SL5, the sampling time of the route environment detecting section 46 is reduced, and the detection area of the monitoring camera 41 or the monitoring sensor 42 is expanded. Further, the monitoring camera 41 and the monitoring sensor 42 near the present transfer route are activated.

As such, at SL6 to SL10, monitoring of the surrounding environment of the transfer robot 1 is also strengthened. Thus, the security is strengthened in comparison with SL1 to SL5.

Figure 21:
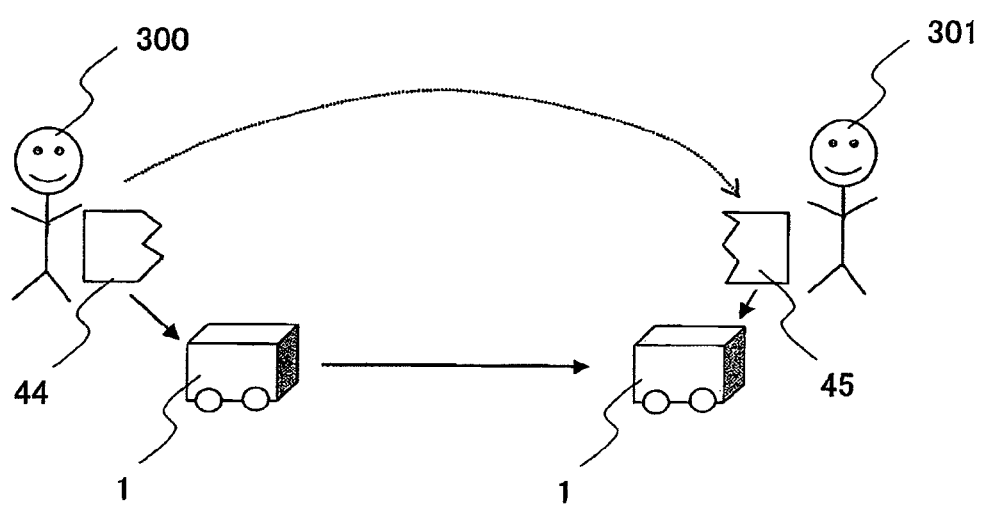
FIG. 21 is a schematic diagram describing a task and unlocking condition setting device and an unlocking condition input device.

A method of implementing the security by using the task and unlocking condition setting device 44 and the unlocking condition input device 45 is described below with reference to FIG. 21. In FIG. 21, numeral 300 indicates a resident who requests the transfer robot 1 for a task. Numeral 301 indicates a resident who is to receive a baggage from the transfer robot 1. As shown in FIG. 21, the task and unlocking condition setting device 44 and the unlocking condition input device 45 serve as a kind of paired tallies, and have two roles consisting of the execution of security and the transfer of the contents of task execution. For example, when a single object plays the two roles of the task and unlocking condition setting device 44 and the unlocking condition input device 45, it serves as a "key". Further, when each of a plurality of residents owns each of a plurality of cards having the same function of serving as the two roles of the task and unlocking condition setting device 44 and the unlocking condition input device 45, predetermined members can share the transferred object accommodated in the accommodation section 11 like in the delivery of a circular notice or the like. Further, in the task and unlocking condition setting device 44 and the unlocking condition input device 45, the task and unlocking condition need not necessarily be registered from the beginning. That is, at the time of using the transfer robot 1, the task and unlocking condition may be registered into the task and unlocking condition setting device 44, and then notified to the unlocking condition input device 45 in the form of electronic information so as to be used. In this method, in the delivery of a parcel described above, the building manager may set up an unlocking condition through the task and unlocking condition setting device 44. Then, information concerning the unlocking condition may be sent to the unlocking condition input device 45 of a resident of delivery destination. Then, at the delivery destination, by using this information, the baggage may be received from the transfer robot 1 having come to the room for delivery.

The other configuration and operation of the third embodiment are similar to those of the first embodiment. Thus, like elements are designated by like reference numerals, and their description is omitted.

Figure 24:
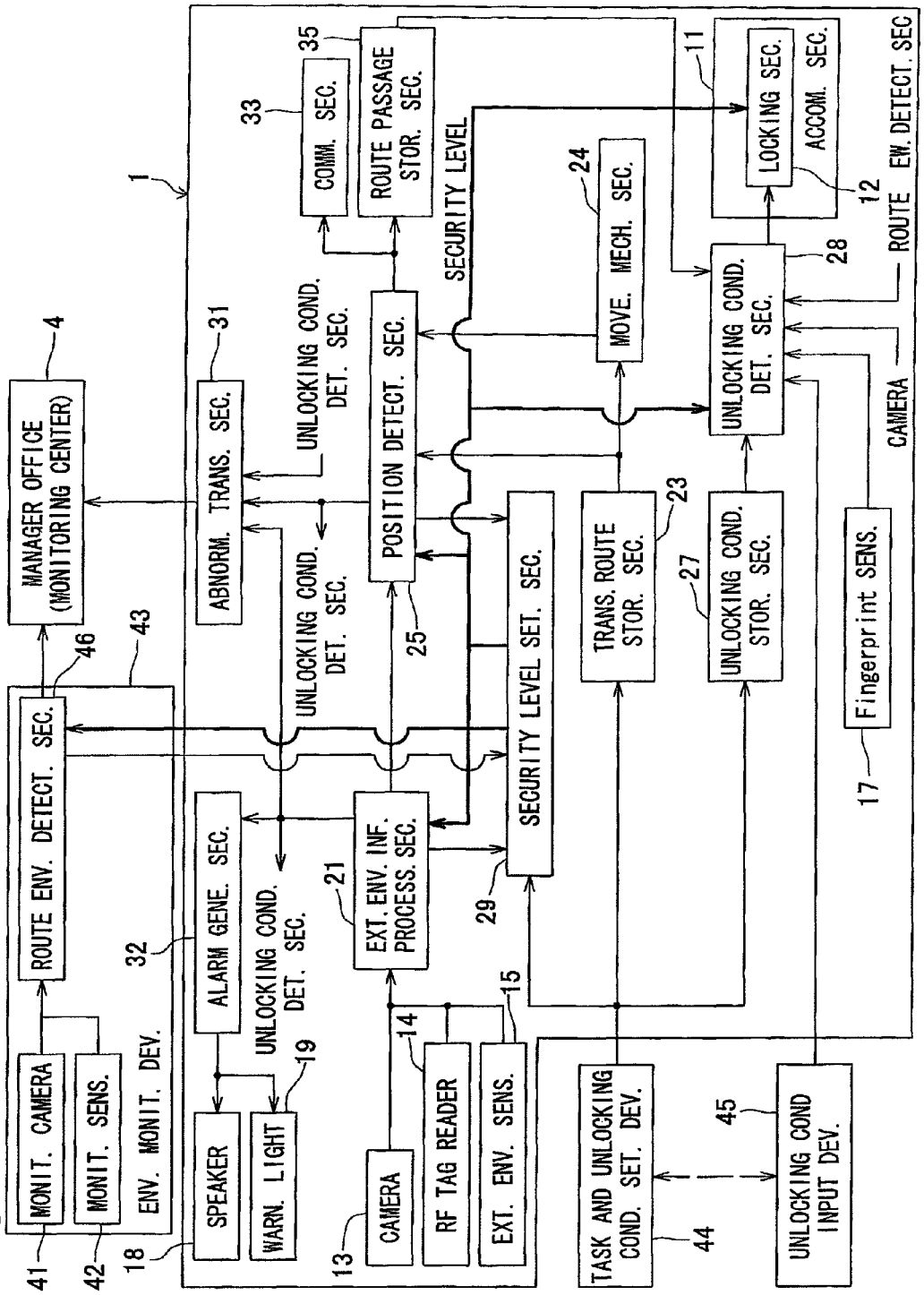
FIG. 24 is a functional block diagram of a transfer robot according to a modification of a third embodiment of the present invention.

As shown in FIG. 24, even in a case that the transfer robot 1 has a route passage storage section 35, an automatic transfer system can be constructed similarly to the present embodiment.

Fourth Embodiment

The first to the third embodiments are examples of application as a physical transfer robot. However, the present invention may be applied also in the transfer of electronic information. A fourth embodiment is described below in which the present invention is applied in the transfer of electronic information (data).

Figure 25:
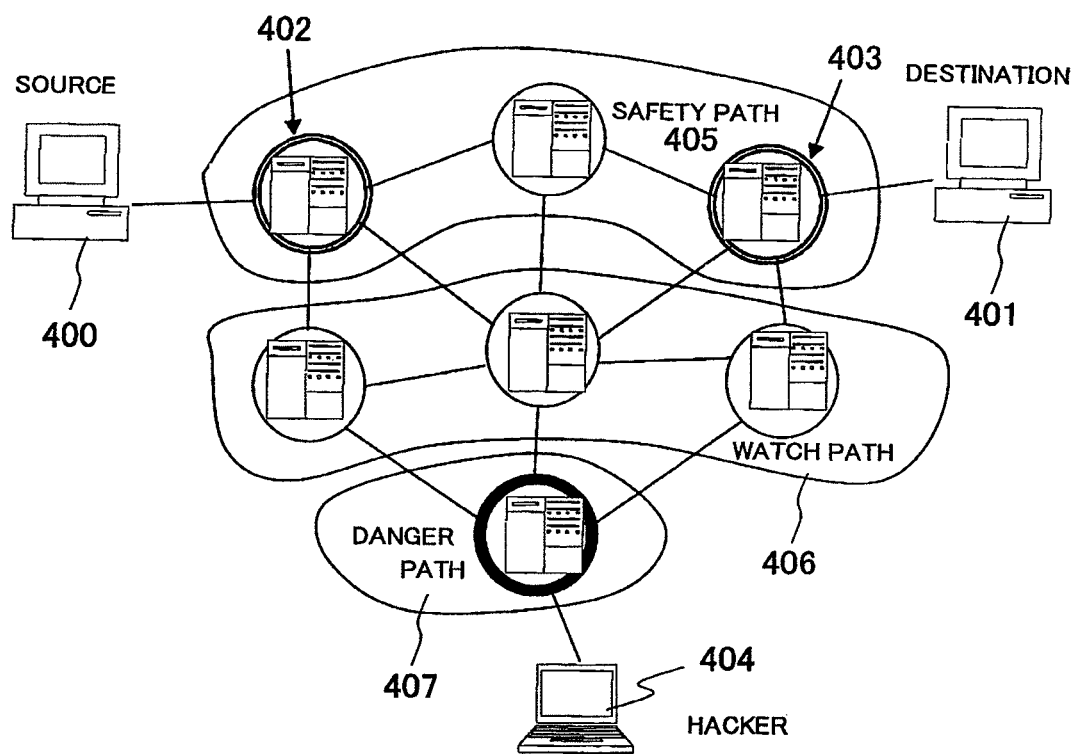
FIG. 25 is a schematic communication circuit diagram describing an electronic information transfer robot according to a fourth embodiment of the present invention.

The present embodiment describes a method in which an agent program for transferring electronic information is employed as an electronic information transfer robot so that electronic information is transferred by this robot. FIG. 25 shows an electronic information transfer robot to which the present invention is applied.

It is assumed that the electronic information to be transferred is transferred from a source computer 400 to a destination computer 401. The information is sent from the source computer, through a gateway server 402 on the source side, through the Internet network, through a gateway 403 on the destination side, and to the destination computer. On the Internet network, the information is sent from the server of the gateway to the destination via adjacent servers.

On the Internet, a possibility of intercept or falsification of electronic information (data) by a malicious hacker 404 is present. In particular, as for confidential information such as development information in a company, a problem of theft by a competing company can arise. Thus, strengthening of security is indispensable. In general, electronic information is sent in an encrypted form. Nevertheless, if the electronic information is stolen, the security is not absolutely reliable. In addition, on the Internet, in general, the path of data transfer can vary depending on the situation of traffic and the like at that time, and hence is not unknown. Thus, it is difficult to avoid a danger path where a hacker is present.

However, the path of electronic information (data) on the Internet can be traced. Further, as for: the present position, the IP address of the server on the communication path can be obtained by using a traceroute command or the like on Windows or Linux. Thus, the path can be known. In addition, IP addresses are administered internationally. Accordingly, the region and the country of the server can be identified on the basis of the address, and even the owner of the server can be identified. Then, on the basis of this, even the present administration position can be identified. Accordingly, a safety path 405, a watch path 406, and a danger path 407 can be set up depending on the IP address of the server to be passed. Thus, when the security is changed depending on the path where the electronic information passes and the site where the electronic information is extracted, electronic information (data) can be sent safely.

Figure 26:
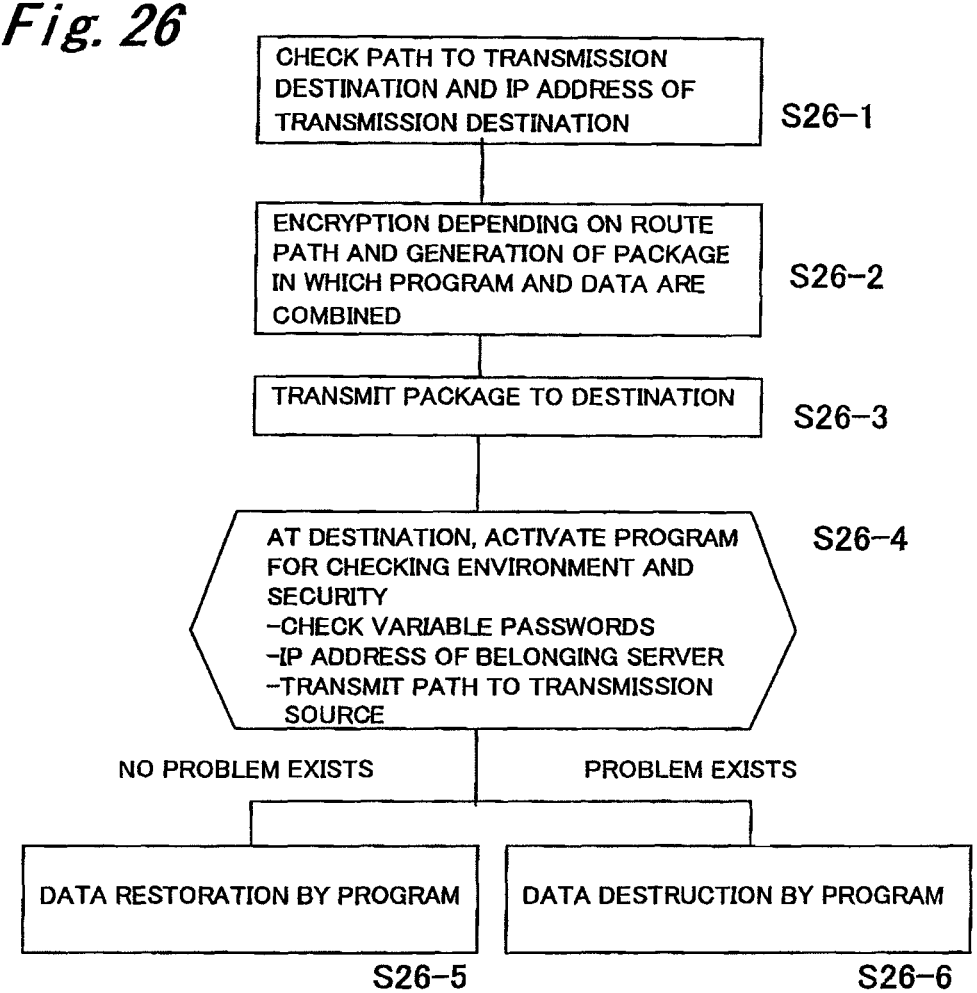
FIG. 26 is a flow chart of data transfer by an electronic information transfer robot according to a fourth embodiment of the present invention.
Figure 27:
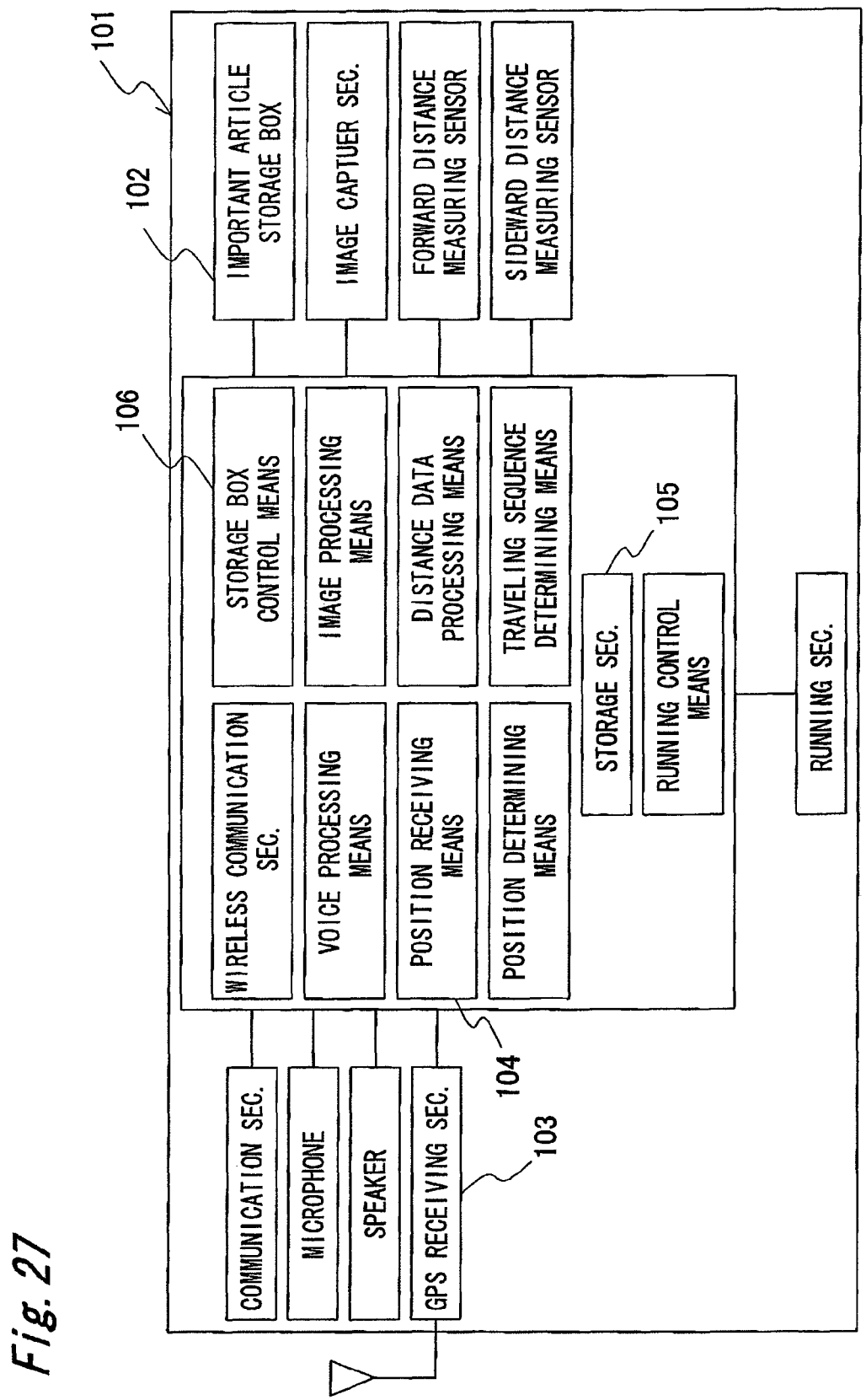
FIG. 27 is a functional block diagram of a conventional transfer robot.

Specifically, security is executed as follows, for example, in accordance with an electronic information transfer flow in FIG. 26.

First, an agent program (transfer robot) having acquired transfer data (electronic information) checks the path to the transmission destination (step S26-1), then sets up a security method such as the strength of encryption and password setting depending on the IP addresses of the servers to be passed, and then incorporates it into the program of transfer data so as to perform packaging (step S26-2). At that time, the packaging is performed together with the path information checked at step S26-1. Then, a package in which the transfer data and the program are combined is transmitted to the destination (step S26-3). Here, when a danger path is contained in the path checked at step S26-1, transmission may be suspended until the traffic on the Internet varies so does the path. At the transmission destination, the received packed agent program (transfer robot) is executed (step S26-4). Here, password having been set up at step S26-1 is checked. Further, the IP address of the gateway of the computer that executes the agent program and the communication path to the source are checked. When abnormality is detected in the password, the IP address of the gateway, and the communication path to the source, the transfer program destroys the data and the program itself (step S26-5), so that the transfer data is protected. Further, the abnormality may be notified to the source. When no abnormality is present, the transfer data is extracted and restored into a form that can be used by the user (step S26-6).

Since the IP address in the program execution site is checked, taking out of the transfer data by a different user is protected. Further, even when the IP address is falsified, since the communication path to the source is checked, the falsification can be detected. Thus, the security is strengthened. At this time, by virtue of the path security, complexity can be reduced in encryption and hence dummy information added for security can be reduced. This permits reduction in the amount of data communication and in the communication time, as well as in the restoration time. As a result, efficient data transmission is achieved.

Here, obviously, the present invention is not limited to the exact forms of the above-mentioned embodiments. That is, at an implementation stage, the components may be modified to an extent not departing from the scope of the present invention.

Further, a plurality of components disclosed in the above-mentioned embodiments may be combined appropriately so that various inventions may also be formed. For example, a few components may be omitted from all the components shown in an embodiment. Alternatively, components concerning different embodiments may be combined appropriately.

According to the automatic transfer method of the present invention, a robot is provided that has a security function of, for example, preventing theft by a third person. In particular, the present invention is applicable in a residential space such as a condominium and also in a public space such as a shopping center and an airport. Further, also in the exchange of electronic information, security can be strengthened in transmission and reception, and hence the present invention is applicable to the exchange of confidential information and personal information.

The present invention has been described above in detail with reference to the accompanying drawings. However, various changes and modifications can be made by a person skilled in the art. Thus, such changes and modifications shall be interpreted as being contained in the present invention as long as they do not depart from the spirit and the scope of the present invention.

What is claimed is:

1. An automatic transfer method employing a transfer robot, comprising:
    allocating beforehand a zone level to each of a plurality of regions constituting an area within which the transfer robot is to be moved, the zone levels being stored in a security level setting section;
    setting up a transfer route of the transfer robot by a transfer route setting section on the basis of transfer destination information for a transferred object to be transferred by the transfer robot, the transfer destination information being input via an input interface section;
    causing the transfer robot to move by a movement mechanism section toward a transfer destination on the basis of information concerning the transfer route; and
    automatically, via the security level setting section, switching a security level of the transfer robot during movement of the transfer robot toward the transfer destination on the basis of the zone levels allocated to the regions, current position information of the transfer robot which includes which of the regions the transfer robot is currently positioned, and type information of the transferred object.

2. The automatic transfer method according to claim 1, wherein a take-out port for the transferred object is locked on the basis of information concerning the security level.

3. The automatic transfer method according to claim 1, wherein in the switching of the security level by the security level setting section, passage information of the transfer robot at points having been set up beforehand along the transfer route is further used.

4. The automatic transfer method according to claim 1, wherein in the switching of the security level by the security level setting section, information concerning a person who accompanies the transfer robot is further used.

5. The automatic transfer method according to claim 1, wherein in the switching of the security level by the security level setting section, route environment information from environment monitoring devices installed in surroundings of the transfer route is further used.

6. The automatic transfer method according to claim 2, wherein in the switching of the security level by the security level setting section, unlocking condition setting information from an unlocking condition setting device that sets up an unlocking condition for the take-out port is further used.

7. The automatic transfer method according to claim 6, wherein input of unlocking information from an unlocking condition input device paired with the unlocking condition setting device is necessary for unlocking of the take-out port.

8. A transfer robot for transferring a transferred object, comprising:
- a transfer route storage section for storing a transfer route having been set up on the basis of transfer destination information for the transferred object;
- a movement mechanism section for moving toward a transfer destination on the basis of the transfer route; and
- a security level setting section for storing zone levels respectively allocated to regions constituting an area within which the transfer robot is to move, and for switching a security level during movement of the transfer robot on the basis of the zone levels allocated to the regions, current position information which includes which of the regions the transfer robot is currently positioned, and type information of the transferred object.

9. The transfer robot according to claim 8, further comprising a locking section for locking a take-out port for the transferred object on the basis of the security level.

10. The transfer robot according to claim 9, further comprising:
- an unlocking determination section for determining unlocking of the locking section; and
- an unlocking condition storage section for storing an unlocking condition used in the determination by the unlocking determination section.

11. The transfer robot according to claim 10, wherein the unlocking condition storage section is removable.

12. An automatic transfer system comprising:
- a transfer robot that has a transfer route storage section for storing a transfer route having been set up on the basis of transfer destination information, a movement mechanism section for moving toward a transfer destination on the basis of information concerning the transfer route, and a security level setting section for storing zone levels respectively allocated to regions constituting an area within which the transfer robot is to move and for switching a security level during movement of the transfer robot toward the transfer destination on the basis of the zone levels allocated to the regions, current position information which includes which of the regions the transfer robot is currently positioned, and type information of the transferred object; and
- an environment monitoring device that monitors the transfer route of the transfer robot and switches a monitoring level for the transfer route in accordance with the security level.

13. The automatic transfer system according to claim 12, further comprising:
- an unlocking condition setting device for notifying the transfer route and unlocking condition setting information to the transfer route storage section and an unlocking condition storage section in the transfer robot, respectively; and
- an unlocking condition input device that is paired with the unlocking condition setting device and that, at the time of unlocking, notifies unlocking information to an unlocking determination section so as to perform unlocking.

14. The automatic transfer system according to claim 13, wherein the unlocking condition storage section that is removable from the transfer robot serves also as the unlocking condition setting device.

\* \* \* \* \*